United States Patent [19]

Motoyama et al.

[11] Patent Number: 5,760,928

[45] Date of Patent: Jun. 2, 1998

[54] IMAGE FORMING APPARATUS UTILIZING PLURAL IMAGE FORMING METHODS AND RECORDING AGENT COLOR DETECTION

[75] Inventors: Eiichi Motoyama, Tokyo; Yasuhiro Yamada, Yokohama, both of Japan

[73] Assignee: Canon Kabushiki Kaisha, Tokyo, Japan

[21] Appl. No.: 521,456

[22] Filed: Aug. 30, 1995

[30] Foreign Application Priority Data

Aug. 31, 1994 [JP] Japan ................. 6-207209
Aug. 31, 1994 [JP] Japan ................. 6-207489

[51] Int. Cl.⁶ ................................ H04N 1/23
[52] U.S. Cl. ................ 358/501; 358/296; 358/300; 358/502; 399/1; 347/2
[58] Field of Search ................ 358/296, 300, 358/501, 502, 504, 401, 468, 515; 395/114; 355/202; 347/2, 3; 399/1, 2

[56] References Cited

U.S. PATENT DOCUMENTS

| | | |
|---|---|---|
| 4,587,536 | 5/1986 | Saito et al. ................. 399/179 |
| 5,081,596 | 1/1992 | Vincent et al. ............. 395/104 |
| 5,162,853 | 11/1992 | Ito et al. ..................... 355/245 |
| 5,321,467 | 6/1994 | Tanaka et al. .............. 347/3 |
| 5,373,350 | 12/1994 | Taylor et al. ............... 355/202 |
| 5,561,500 | 10/1996 | Ohzeki et al. .............. 355/202 |
| 5,570,451 | 10/1996 | Sakaizawa et al. ........ 355/202 |
| 5,592,262 | 1/1997 | Tanaka et al. .............. 399/1 |

Primary Examiner—Peter S. Wong
Assistant Examiner—Derek J. Jardieu
Attorney, Agent, or Firm—Fitzpatrick, Cella, Harper & Scinto

[57] ABSTRACT

In an image forming apparatus which combines a plurality of different image forming methods, the image forming operations of the plurality of image forming methods are controlled in accordance with the color of an original image and the color of a recording agent, so that image formation in a desired color can be reliably attained, and copying errors can be eliminated. In another aspect, by appropriately selecting the plurality of image forming methods in correspondence with the feature of an image, high-quality image formation can be attained in correspondence with the image feature.

37 Claims, 26 Drawing Sheets

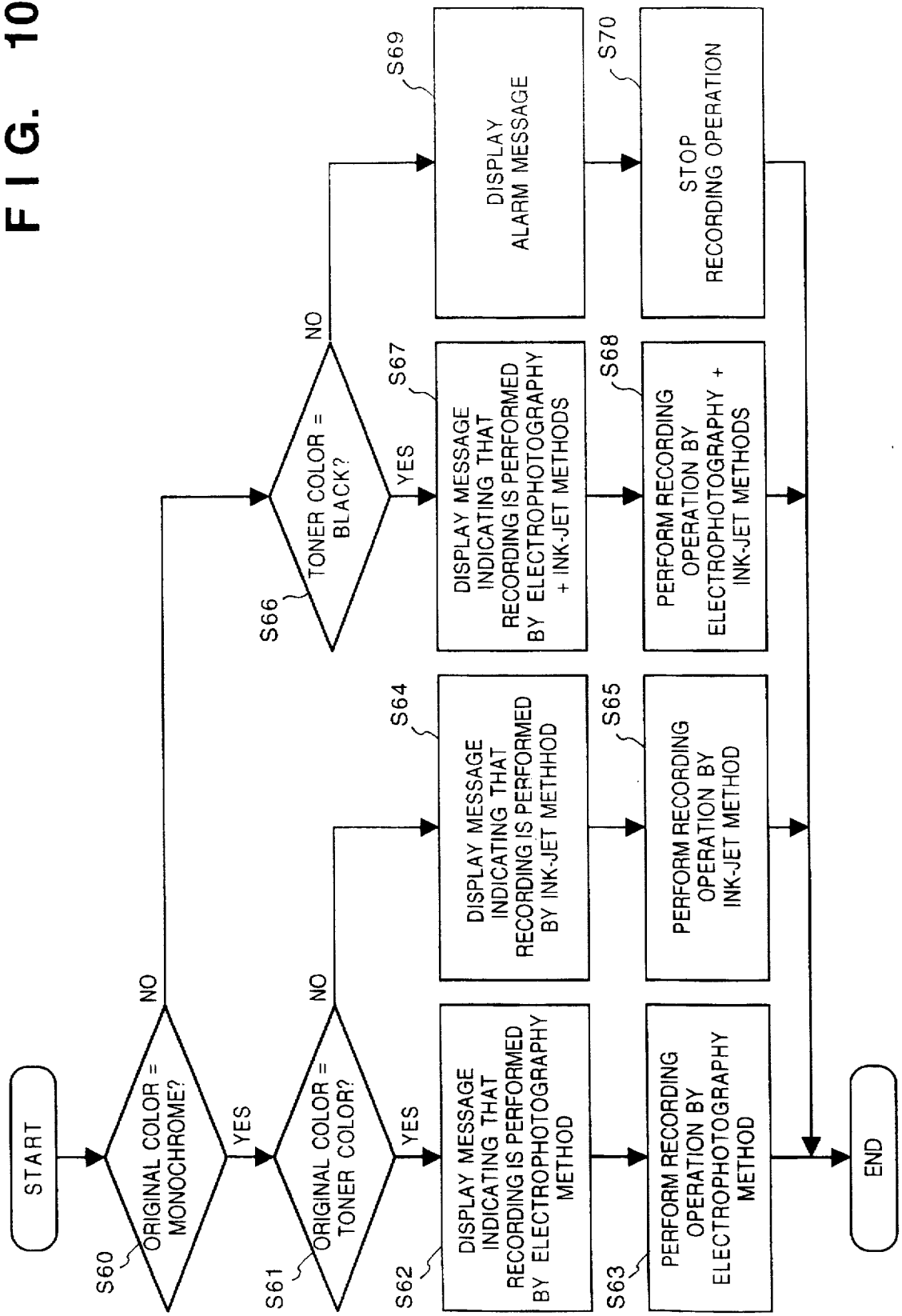

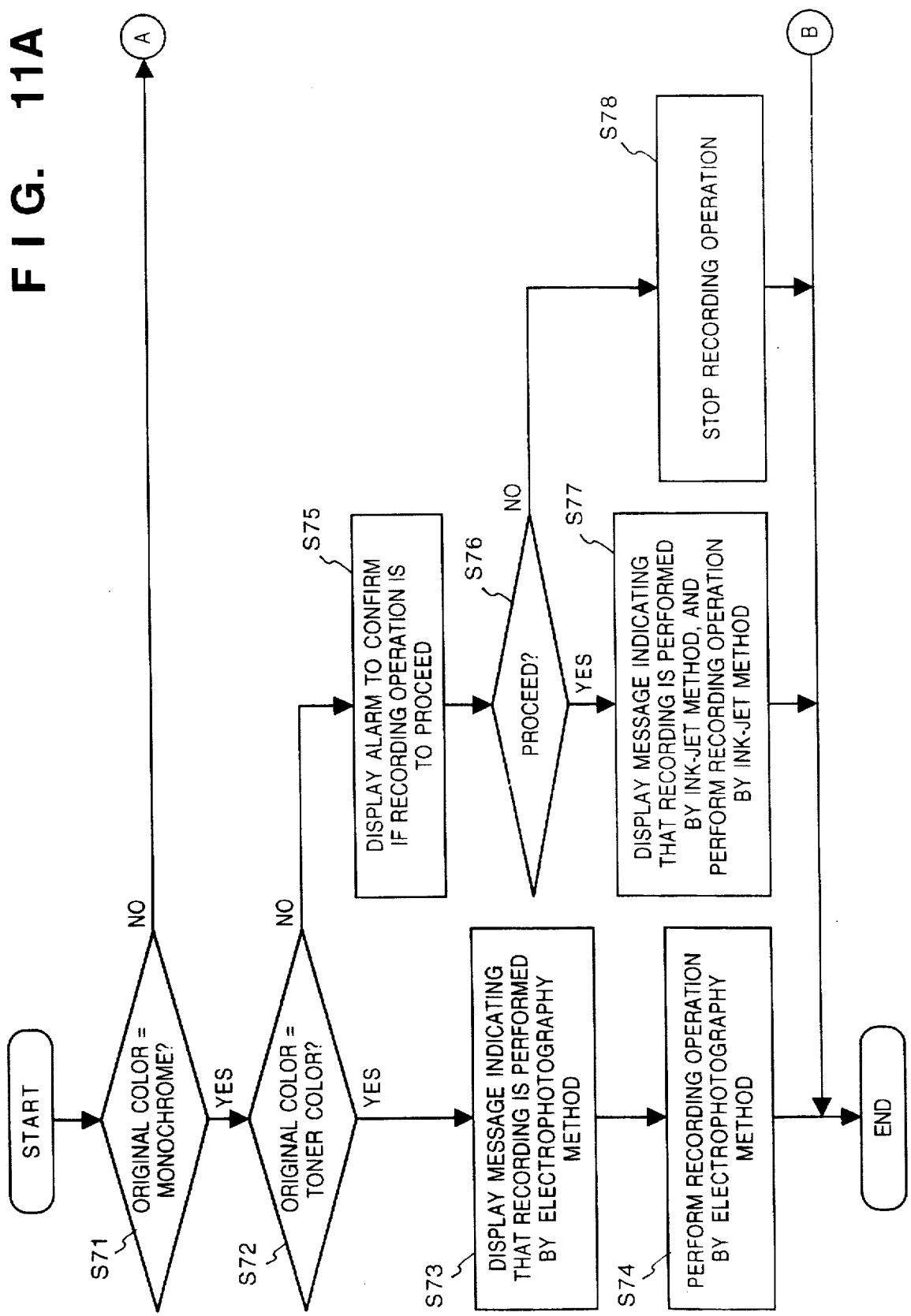

IMAGE FORMING APPARATUS UTILIZING PLURAL IMAGE FORMING METHODS AND RECORDING AGENT COLOR DETECTION

BACKGROUND OF THE INVENTION

This invention relates to an image forming method and apparatus and, more particularly, to an image forming method and apparatus, which comprises a plurality of image forming units of different image forming methods.

As a typical image forming method of a conventional image forming apparatus for recording an image on a recording medium, the electrophotography method, the ink-jet method, and the like are used.

In the electrophotography method, a latent image is formed on a photosensitive drum which is charged on the basis of input image information, and is developed. The developed image is transferred and fixed onto a recording medium, thus reproducing the input image information.

On the other hand, in the ink-jet method, driving pulses for an ink-jet head having a plurality of ink ejection nozzles are generated on the basis of input image data to control the presence/absence of ink ejection from the respective nozzles, thereby reproducing input image information.

Also, a method of reproducing image information by combining these two methods has been reported. In this method, the entire image is formed by reproducing an achromatic portion in an image by the electrophotography method and reproducing a chromatic portion using color inks of the ink-jet method. For example, in a copying machine, two image forming units are selectively used to form an image in such a manner that a monochrome copy is formed by the electrophotography method and a full-color copy is formed by the ink-jet method. Such a copying machine having a plurality of image forming methods will be referred to as a "hybrid copying machine" hereinafter.

However, in the conventional hybrid copying machine as a combination of the electrophotography method and the ink-jet method, the image forming methods are selectively used simply in units of color components upon reproduction of image information. Therefore, when an image is to be actually reproduced, characters/thin lines in an image are often reproduced by both the electrophotography method and the ink-jet method, and image quality considerably deteriorates as compared to characters/thin lines reproduced by one of the electrophotography method and the ink-jet method.

More specifically, in the conventional hybrid copying machine, a K (black) component is recorded using a toner, and C (cyan), M (magenta), and Y (yellow) components are recorded using inks. Therefore, if an achromatic edge is expressed by both K component and C, M, and Y components, the edge is reproduced by both the toner and inks, thus deteriorating the image quality of the edge due to their different color development characteristics.

Also, since a halftone image region is expressed by mixing the toner and inks, deterioration of image quality cannot be avoided, and a dark portion is unnaturally reproduced.

In the conventional hybrid copying machine, a recording unit of the electrophotography method adopts a cartridge which integrates principal portions such as a drum, and when toner is used up, the cartridge itself is exchanged, thereby realizing a maintenance-free drum unit, and the like. As the toner cartridge, monochrome toner cartridges filled with monochrome toners such as red toner, blue toner, yellow toner, and the like are available in addition to a black toner cartridge. By setting such a monochrome toner cartridge in a recording unit, monochrome recording other than black can be realized.

However, when a copied image of the electrophotography method is to be obtained by setting a monochrome toner cartridge, the color of the toner cartridge set in the recording unit cannot be determined until a recorded output (copied image) is actually observed. For example, when a user wants to obtain a black output, a copied image recorded in red may be unnecessarily output. Note that a similar problem occurs not only in the toner cartridge but also in ink cartridges of the ink-jet method.

SUMMARY OF THE INVENTION

It is an object of the present invention to provide an image forming method and apparatus which combine a plurality of different image forming methods, wherein image forming operations based on the plurality of image forming methods are controlled in correspondence with the color of an original image and the color of a set recording agent.

According to the present invention, the foregoing object is attained by providing an image forming apparatus comprising: input means for inputting an original image; determination means for determining a color of the original image; first and second image forming means for forming images on a recording medium on the basis of the original image; detection means for detecting a color of a recording agent used by said first image forming means; and control means for controlling image forming operations of said first and second image forming means in accordance with a determination result of said determination means and a detection result of said detection means.

In accordance with the present invention as described above, since the image forming operations of the first and second image forming means can be controlled in correspondence with the color of an original image and the color of a recording agent used by the first image forming means, image formation in a desired color can be reliably attained, thus eliminating copying errors.

It is another object of the present invention to provide an image forming method and apparatus which combine a plurality of different image forming methods, wherein image forming operations based on the plurality of image forming methods are controlled in correspondence with the color component images of an original image and the color of a set recording agent.

According to the present invention, the foregoing object is attained by providing an image forming apparatus comprising: input means for inputting an original image; color separation means for separating the original image into color component images; first and second image forming means for forming the original image by respectively recording the color component images on a recording medium; detection means for detecting a color of a recording agent used by said first image forming means; and control means for controlling image forming operations of said first and second image forming means in accordance with the color component images separated by said color separation means and a detection result of said detection means.

In accordance with the present invention as described above, since the image forming operations of the first and second image forming means can be controlled in correspondence with the color component images of an original image and the color of a recording agent used by the first image forming means, image formation in a desired color can be reliably attained, thus eliminating copying errors.

It is another object of the present invention to provide an image forming method and apparatus which combine a plurality of different image forming methods, wherein the plurality of methods can be satisfactorily selectively used in correspondence with the feature of an image.

According to the present invention, the foregoing object is attained by providing an image forming apparatus comprising: input means for inputting image information; determination means for determining a specific region from the image information; first and second image forming means for forming images on a recording medium on the basis of the image information; and control means for controlling image forming operations of said first and second image forming means on the basis of a determination result of said determination means.

In accordance with the present invention as described above, since a specific region can be discriminated on the basis of image information, and the image forming operations of the first and second image forming means are controlled in accordance with the discrimination result, high-quality image formation can be realized in correspondence with the feature of an image.

The invention is particularly advantageous since an image processing method and apparatus, which combine a plurality of different image forming methods and can selectively use the plurality of methods in correspondence with the color of a recording agent and the original color, can be provided.

Since the color of the set recording agent can be determined without checking an actually recorded output, an image processing method and apparatus, which can prevent an image recorded in an undesired color from being output, can be provided.

Also, an image processing method and apparatus, which can satisfactorily selectively use a plurality of image forming methods in correspondence with the feature of an image, can be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a flow chart showing an example of a copying operation sequence of the sixth embodiment;

FIGS. 11A and FIG. 11B are flow charts showing an example of a copying operation sequence of the seventh embodiment;

DESCRIPTION OF THE PREFERRED EMBODIMENTS

Preferred embodiments of the present invention will now be described in detail in accordance with the accompanying drawings.

(First Embodiment)

Figure 1:
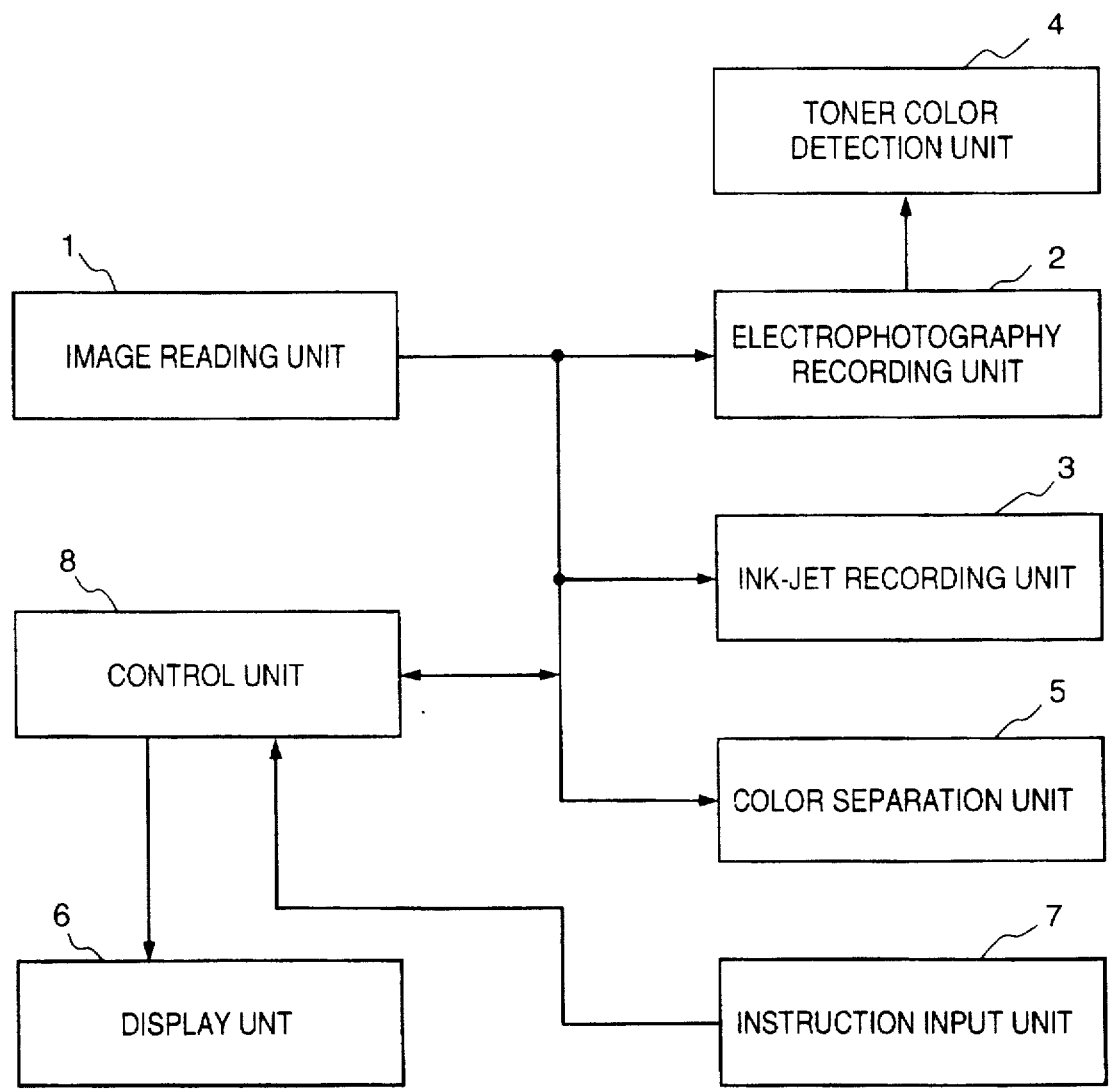
FIG. 1 is a block diagram showing the arrangement of an image recording apparatus according to an embodiment of the present invention.

FIG. 1 is a block diagram showing the arrangement of an image recording apparatus according to the first embodiment of the present invention. Note that the image recording apparatus of the first embodiment is applied to a copying machine or the like, which does not use both the electrophotography method and the ink-jet method to record information on a single recording sheet, and does not automatically discriminate one of the two methods to be used in recording.

Referring to FIG. 1, reference numeral 1 denotes an image reading unit for reading an original image; and 2, an electrophotography recording unit for recording an image on a recording medium by the electrophotography method. The recording unit 2 can attain monochrome recording on the basis of image data input by the image reading unit 1. Note that the recording color can be changed by exchanging a toner cartridge, and recording of some colors including black can be realized. Reference numeral 3 denotes an ink-jet recording unit for recording an image on a recording medium by the ink-jet method. The recording unit 3 can attain full-color recording using four color inks, i.e., black, cyan, magenta, and yellow inks. Reference numeral 4 denotes a toner color detection unit for detecting the toner color of a toner cartridge set in the recording unit 2. Reference numeral 5 denotes a color separation unit for separating an original image read by the image reading unit 1 into color components, and discriminating the color most frequently used in the original image (to be referred to as an original color hereinafter). The original color output as the discrimination result of the color separation unit 5 is one of toner colors that can be used by the recording unit 2.

Reference numeral 8 denotes a control unit for controlling the above-mentioned units in accordance with an operator's instruction input via an instruction input unit 7. Also, the control unit 8 displays information such as the operation state, the operation conditions, and the like of this embodiment on a display unit 6 serving as a user interface to inform the operator of it. Note that the display unit 6 comprises, e.g., an LCD panel, and the instruction input unit 7 comprises, e.g., a keyboard, a touch panel, or the like. Note that the display unit 6 and the instruction input unit 7 are integrated as an operation unit 20, as shown in FIG. 2.

Figure 2:
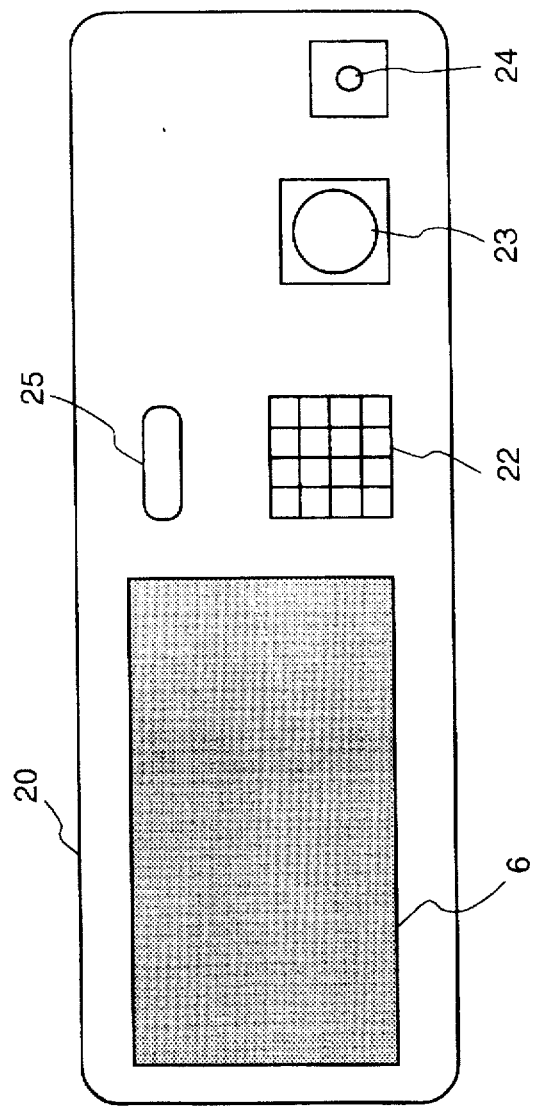
FIG. 2 is a plan view showing an example of an operation unit including a display unit and an instruction input unit shown in FIG. 1.

Referring to FIG. 2, the display unit 6 comprising, e.g., an LCD panel displays the possible/impossible state of the operation of this embodiment, the copy count, the copy magnification, the image processing parameters, the toner color detected by the toner color detection unit 4, and the like. Note that the display unit 6 is not limited to an LCD but may adopt any other display methods such as a display method using a plurality of LEDs as long as information can be informed to an operator. Reference numerals 22 to 25 denote a plurality of keys constituting the instruction input unit 7. More specifically, the input keys 22 are used when the image processing parameters, and the like are to be changed. The start key 23 is used for instructing the start of, e.g., a copying operation. The stop key 24 is used for instructing the stop of the operation. The recording method switch key 25 is used for instructing whether the electrophotography recording unit 2 or the ink-jet recording unit 3 is used. Note that the currently selected recording method is displayed on the display unit 6.

Figure 3:
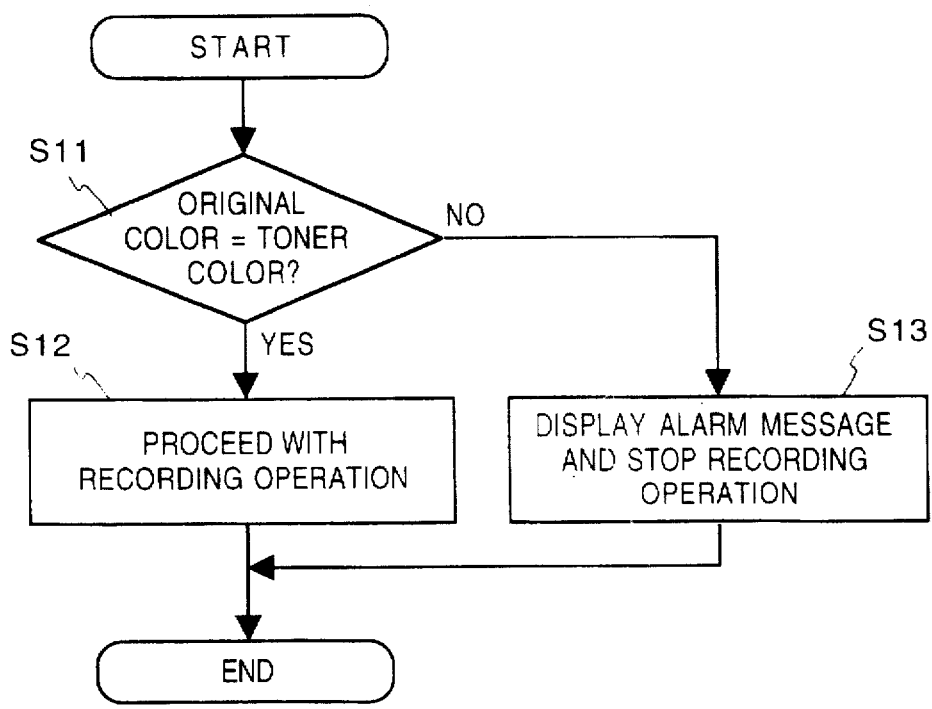
FIG. 3 is a flow chart showing an example of a copying operation sequence of the first embodiment.

FIG. 3 is a flow chart showing an example of the operation sequence executed when the start of the copying operation is instructed by the start key 23 while the electrophotography recording unit 2 is selected. This flow chart is executed by the control unit 8, and is stored in an internal ROM of the control unit 8 as a processing program.

Referring to FIG. 3, in step S11, the original color discriminated by the color separation unit 5 is compared with the current toner color detected by the toner color detection unit 4. If the two colors match with each other, a recording operation is performed by the electrophotography method in step S12; otherwise, an alarm message indicating that the two colors are different from each other is displayed on the display unit 6 in step S13, thus stopping the recording operation. As the alarm message, for example, when the original color is black and the toner color is red, a message "please exchange with black toner cartridge", "red cartridge is set", "original color is different from toner cartridge color", or the like is used.

As described above, according to this embodiment, in the hybrid copying machine which can selectively use one of the electrophotography recording unit 2 and the ink-jet recording unit 3, the toner color of the toner cartridge set in the electrophotography recording unit 2 can be detected, and when the input original color does not coincide with the detected toner color, an alarm message can be displayed. Therefore, a problem that a copied result recorded in red is undesirably output when a copied output recorded in black is to be obtained can be avoided.

(Second Embodiment)

An image recording apparatus according to the second embodiment of the present invention will be described below. Note that the same reference numerals in the second embodiment denote substantially the same parts as in the first embodiment, and a detailed description thereof will be omitted. Also, note that the image recording apparatus of the second embodiment is applied to a copying machine or the like, which does not use both the electrophotography method and the ink-jet method to record information on a single recording sheet, and does not automatically discriminate one of the two methods to be used in recording, as in the first embodiment.

Figure 4:
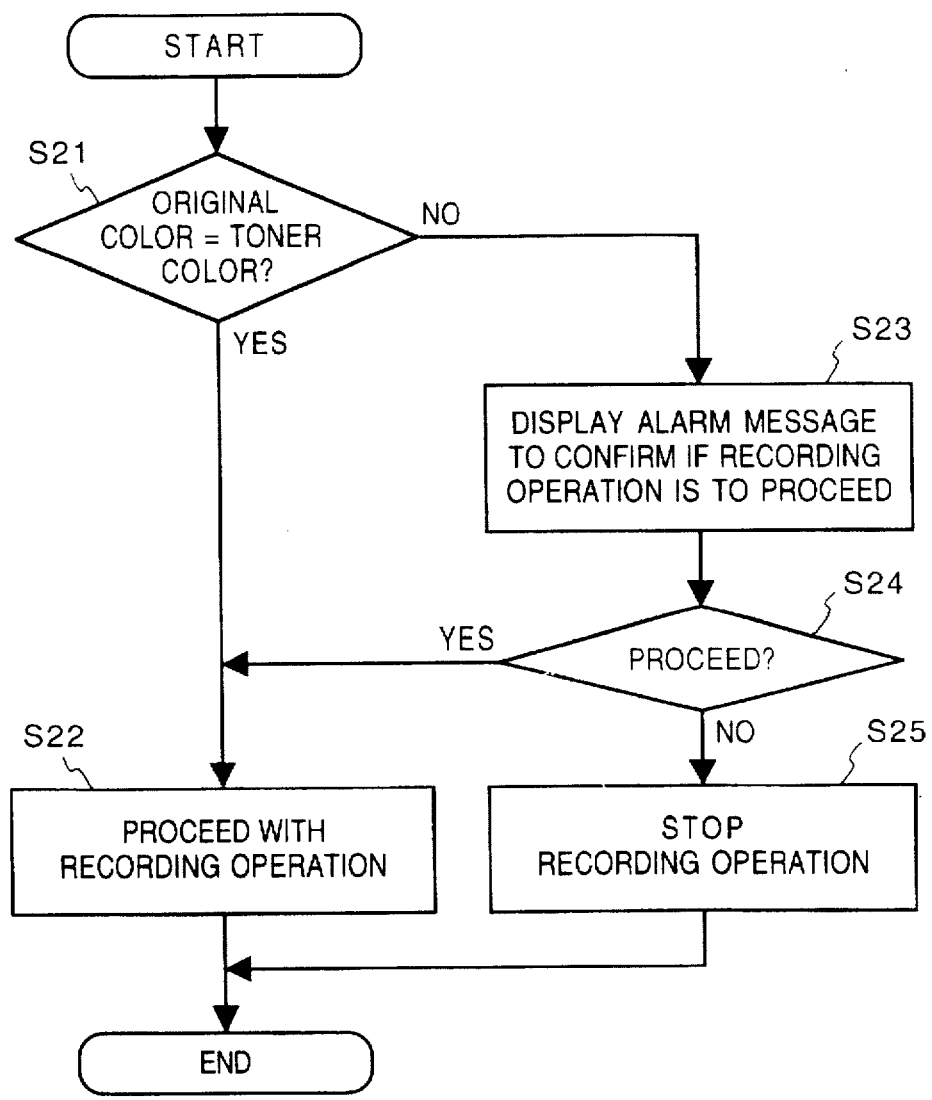
FIG. 4 is a flow chart showing an example of a copying operation sequence of the second embodiment.

FIG. 4 is a flow chart showing an example of the operation sequence executed when the start of the copying operation is instructed by the start key 23 while the electrophotography recording unit 2 is selected. This flow chart is executed by the control unit 8, and is stored in an internal ROM of the control unit 8 as a processing program.

Referring to FIG. 4, in step S21, the original color discriminated by the color separation unit 5 is compared with the current toner color detected by the toner color detection unit 4. If the two colors coincide with each other, a recording operation is performed by the electrophotography method in step S22; otherwise, an alarm message indicating that the two colors are different from each other is displayed on the display unit 6, and the operator is inquired as to whether to proceed with the recording operation by the electrophotography method, in step S23. As the alarm & proceeding confirmation message, for example, when the original color is black and the toner is red, a message "black toner cartridge is not set. Do you want to proceed with copying?", "original color is different from cartridge color. Do you want to proceed with copying?", "do you want to copy using red toner?", or the like is used.

In step S24, the operator's instruction is discriminated. For example, if the start key 23 is depressed again, the recording operation by the electrophotography method is proceeded in step S22; if the stop key 24 is depressed, the recording operation is stopped in step S25.

As described above, according to this embodiment, in the hybrid copying machine, the toner color of the toner cartridge set in the electrophotography recording unit 2 is detected, and when the input original color is different from the detected toner color, an alarm & proceeding confirmation message can be displayed. Therefore, a problem that a copied result recorded in red is undesirably output when a copied output recorded in black is to be obtained can be avoided, and when the operator does not care if a copied result different from the original color is obtained, a copied output can be easily obtained.

(Third Embodiment)

An image recording apparatus according to the third embodiment of the present invention will be described below. Note that the same reference numerals in the third embodiment denote substantially the same parts as in the first embodiment, and a detailed description thereof will be omitted. Also, note that the image recording apparatus of the third embodiment is applied to a copying machine or the like, which does not use both the electrophotography method and the ink-jet method to record information on a single recording sheet, and does not automatically discriminate one of the two methods to be used in recording, as in the first embodiment.

Figure 5:
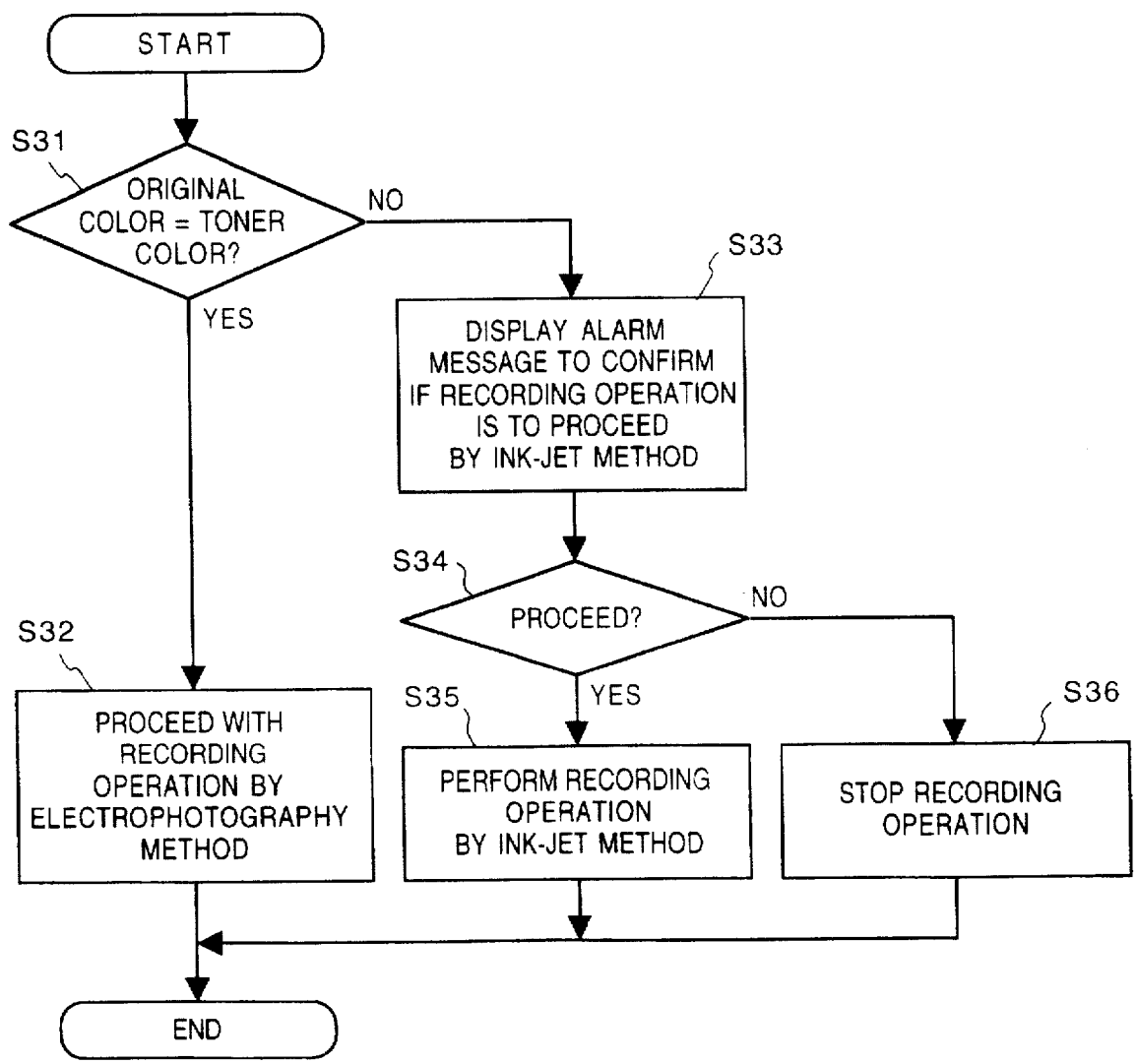
FIG. 5 is a flow chart showing an example of a copying operation sequence of the third embodiment.

FIG. 5 is a flow chart showing an example of the operation sequence executed when the start of the copying operation is instructed by the start key 23 while the electrophotography recording unit 2 is selected. This flow chart is executed by the control unit 8, and is stored in an internal ROM of the control unit 8 as a processing program.

Referring to FIG. 5, in step S31, the original color discriminated by the color separation unit 5 is compared with the current toner color detected by the toner color detection unit 4. If the two colors coincide with each other, a recording operation is performed by the electrophotography method in step S32; otherwise, an alarm message indicating that the two colors are different is displayed on the display unit 6, and the operator is inquired as to whether to proceed with the recording operation by the ink-jet method, in step S33. As the alarm & substitution confirmation message, for example, when the original color is black and the toner is red, a message "black toner cartridge is not set. Do you want to proceed with copying by ink-jet method?", "original color is different from cartridge color. Do you want to proceed with copying by ink-jet method?", "red cartridge is set. Do you want to proceed with copying by ink-jet method?", or the like is used.

In step S34, the operator's instruction is discriminated. For example, if the start key 23 is depressed again, the recording operation is proceeded by the ink-jet method in step S35; if the stop key 24, for example, is depressed, the recording operation is stopped in step S36.

As described above, according to this embodiment, in the hybrid copying machine, the toner color of the toner cartridge set in the electrophotography recording unit 2 is detected, and when the input original color is different from the detected toner color, an alarm & substitution confirmation message with the ink-jet method can be displayed. Therefore, a problem that a copied result recorded in red is undesirably output when a copied output recorded in black is to be obtained can be avoided, and when a toner cartridge matching the original color is not available or the toner cartridge is not to be exchanged, a copied output corresponding to the original color can be obtained by the ink-jet method.

(Fourth Embodiment)

An image recording apparatus according to the fourth embodiment of the present invention will be described below. Note that the same reference numerals in the fourth embodiment denote substantially the same parts as in the first embodiment, and a detailed description thereof will be omitted. Also, note that the image recording apparatus of the fourth embodiment is applied to a copying machine or the like, which does not use both the electrophotography method and the ink-jet method to record information on a single recording sheet, and has a function of automatically discriminating one of the two methods to be used in recording.

Figure 6:
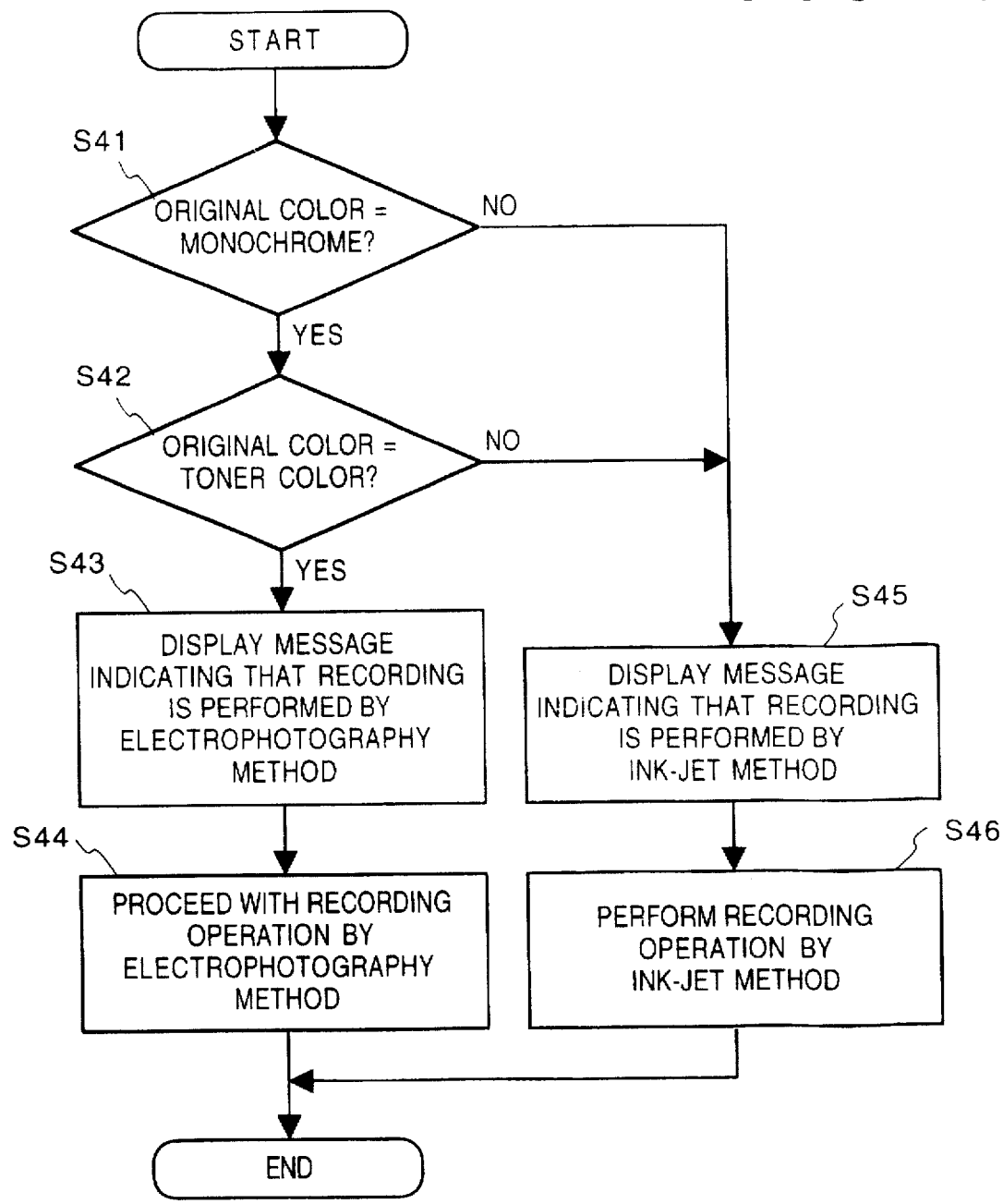
FIG. 6 is a flow chart showing an example of a copying operation sequence of the fourth embodiment.

FIG. 6 is a flow chart showing an example of the operation sequence executed when the start of the copying operation is instructed by the start key 23 while the recording method automatic discrimination function is enabled. This flow chart is executed by the control unit 8, and is stored in an internal ROM of the control unit 8 as a processing program.

Referring to FIG. 6, if the color separation unit 5 determines in steps S41 and S42 that the original color is a single color (monochrome) and coincides with the current toner color, a message indicating, e.g., that "start copying by electrophotography method (black)", or the like is displayed in step S43, and the recording unit 2 performs a recording operation by the electrophotography method using the current toner color in step S44. Otherwise, i.e., if the original is not in monochrome (e.g., full-color), or its color is different from the current toner color (e.g., red), a message "copying will be done by ink-jet method (full-color)", "copying will be done by ink-jet method (red)", or the like is displayed in step S45, and the recording unit 3 performs a recording operation by the ink-jet method in step S46.

As described above, according to this embodiment, in the hybrid copying machine, the toner color of the toner cartridge set in the electrophotography recording unit 2 is detected, and the recording method can be automatically selected depending on whether or not the input original is in monochrome and whether or not the original color coincides with the detected toner color. Therefore, a problem that a copied result recorded in red is undesirably output when a copied output recorded in black is to be obtained can be avoided. In addition, when the original color does not coincide with the toner color or when an original is other than a monochrome original such as a full-color original, a copied output corresponding to the original color can be automatically obtained by the ink-jet method.

(Fifth Embodiment)

An image recording apparatus according to the fifth embodiment of the present invention will be described below. Note that the same reference numerals in the fifth embodiment denote substantially the same parts as in the first embodiment, and a detailed description thereof will be omitted. Also, note that the image recording apparatus of the fifth embodiment is applied to a copying machine or the like, which can record information on a single recording sheet by both the electrophotography method and the ink-jet method, and has a function of automatically discriminating one of the two methods to be used in recording.

Figure 7:
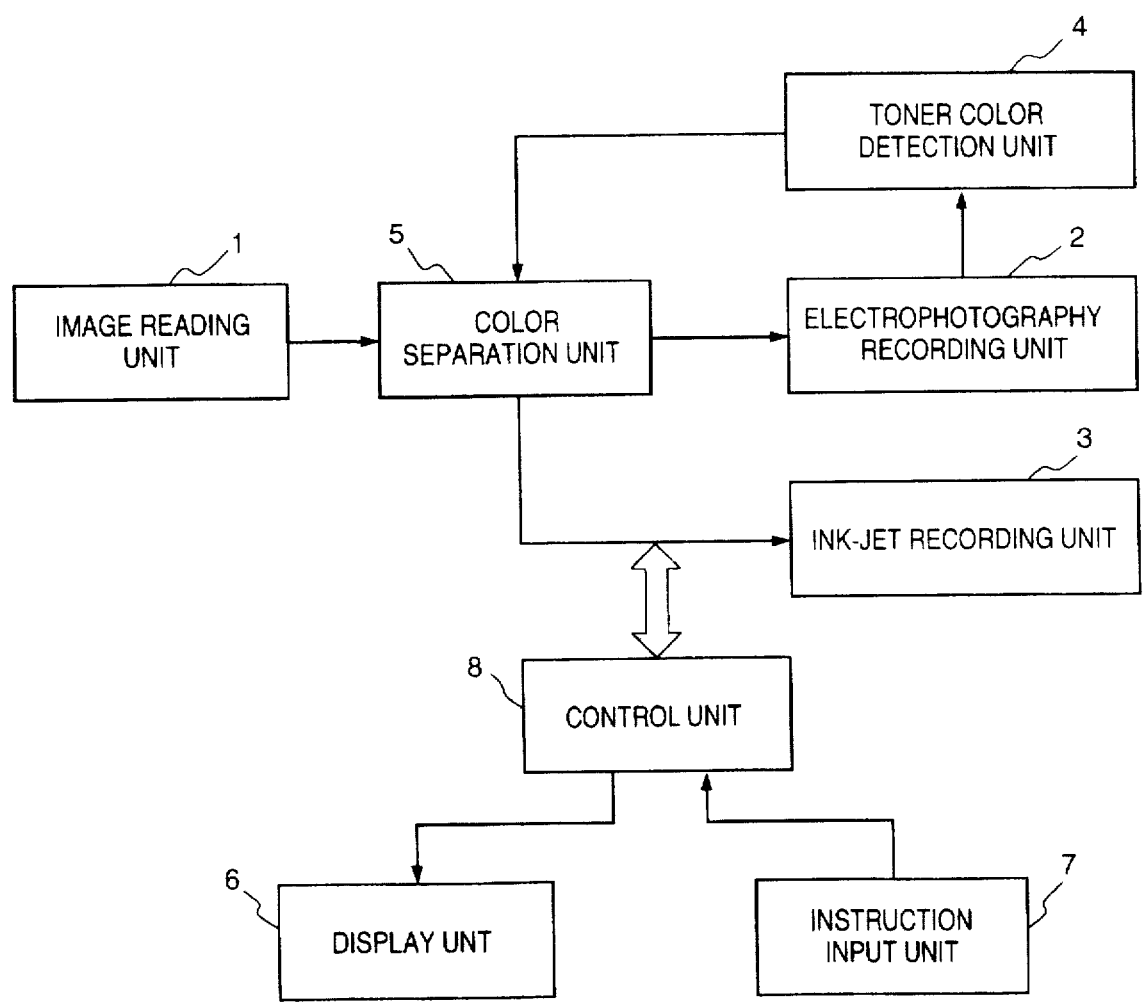
FIG. 7 is a block diagram showing the arrangement of an image recording apparatus according to the fifth embodiment of the present invention.

FIG. 7 is a block diagram showing the arrangement of the image recording apparatus according to the fifth embodiment of the present invention. When the automatic discrimination mode is set in this embodiment, the destination of image data output from the image reading unit 1 changes depending on the discrimination result of the color separation unit 5 in correspondence with the detection result of the toner color detection unit 4. More specifically, the color separation unit 5 discriminates an original color, and distributes image data to the electrophotography recording unit 2 and the ink-jet recording unit 3 in units of color components of the image data. Upon distribution, the color separation unit 5 performs masking processing as color correlation processing and γ correction processing as density correction for color component data depending on the destination recording units of the color components. More specifically, when a black toner cartridge is set in the recording unit 2, the color separation unit 5 supplies black image data to the recording unit 2, and supplies image data other than black to the recording unit 3. In this case, the color separation unit 5 adjusts the supply timings of image data so as to maintain an appropriate positional relationship between the images formed by the recording units 2 and 3.

When the electrophotography recording mode is selected, and the start of a copying operation is instructed by the start key 23, the recording operation is performed by the electrophotography recording unit 2. On the other hand, when the ink-jet recording mode is selected, and the start of a copying operation is instructed by the start key 23, the recording operation is performed by the ink-jet recording unit 3.

Figure 8:
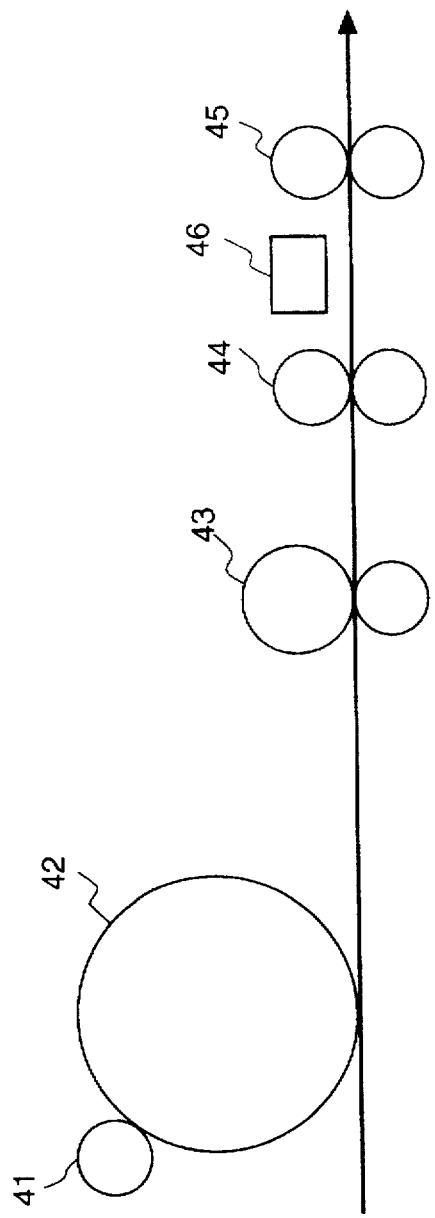
FIG. 8 is a schematic view showing the arrangement of a recording unit shown in FIG. 7.

FIG. 8 is a view showing the arrangement of the recording units of this embodiment. Reference numerals 41, 42, and 43 respectively denote a development drum, a transfer drum, and a fixing drum, which constitute a general electrophotography recording unit. On the other hand, reference numerals 44, 45, and 46 respectively denote sub-scanning rollers, exhaust rollers, and a recording head for ejecting inks, which constitute a general ink-jet recording unit. Note that the recording head 46 can eject four color inks, i.e., black, cyan, magenta, and yellow inks, and can record a full-color image by superposing these four colors upon recording. The recording head may have a plurality of parts, each of which is for each of color components and also may have a common head for the color components. On a recording medium, which is fed in the direction of an arrow in FIG. 8 from a recording medium feeding unit (not shown) present in the left direction in FIG. 8, an image is recorded by the electrophotography method by the electrophotography recording unit 2 constituted by the development drum 41, and the like, and an image is then recorded by the ink-jet method by the ink-jet recording unit 3 constituted by the ink-jet head 46, and the like. When one of the recording methods is selected, the recording unit corresponding to the non-selected method passes the recording medium.

Figure 9:
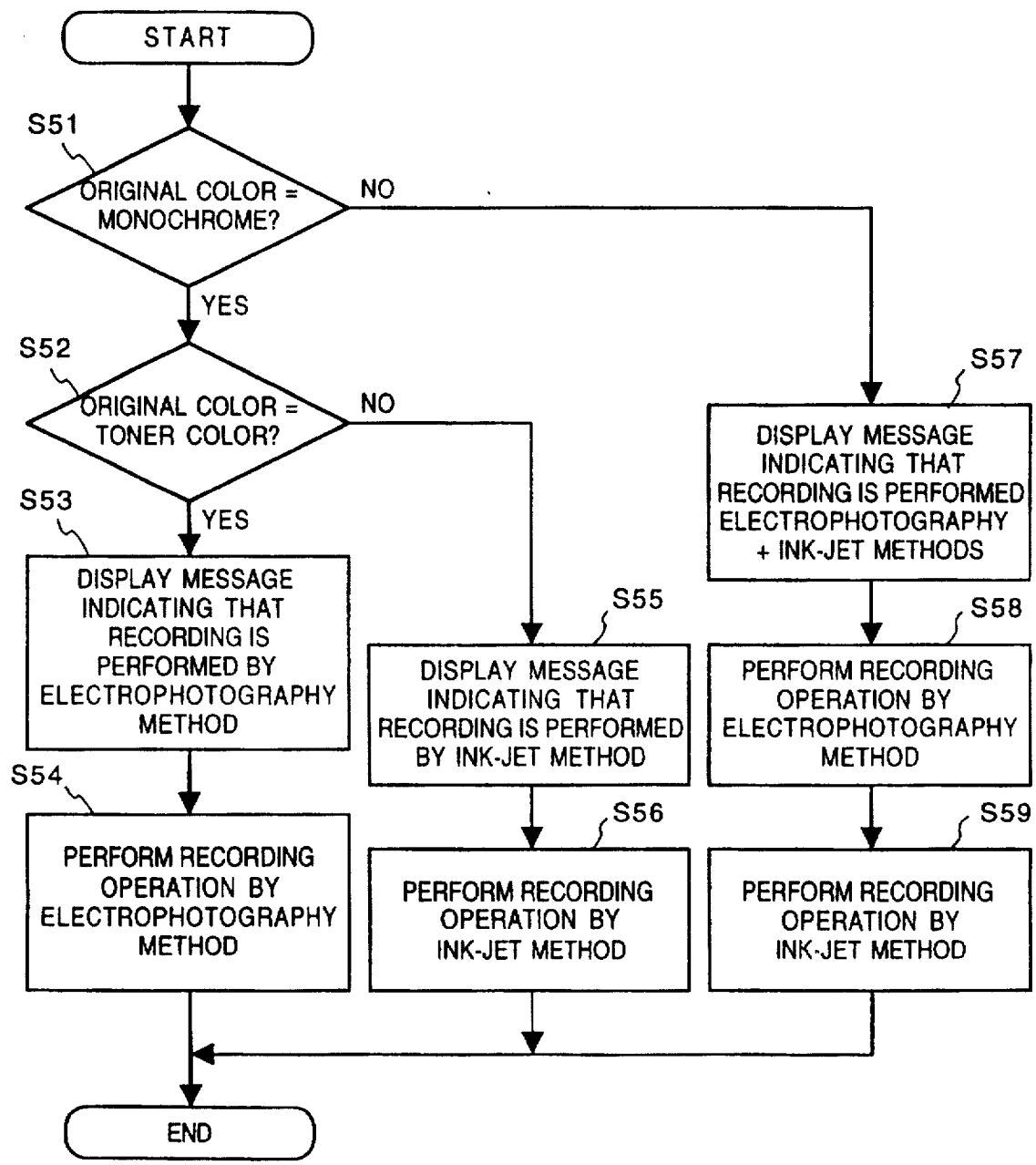
FIG. 9 is a flow chart showing an example of a copying operation sequence of the fifth embodiment.

FIG. 9 is a flow chart showing an example of the operation sequence executed when the start of a copying operation is instructed by the start key 23 while the recording method automatic discrimination function is enabled. This flow chart is executed by the control unit 8, and is stored in an internal ROM of the control unit 8 as a processing program.

Referring to FIG. 9, if the color separation unit 5 determines in steps S51 and S52 that the original color is a single color (monochrome) and coincides with the current toner color, the control unit 8 displays a message indicating, e.g., that "copying will be done by electrophotography method (black)", or the like in step S53, and image data is supplied from the color separation unit 5 to the recording unit 2. In step S54, electrophotography recording using the current toner color is performed.

On the other hand, if it is determined that the original is in monochrome (e.g., black) but its color is other than the current toner color (e.g., red), the flow branches to step S55, and the control unit 8 displays a message "copying will be done by ink-jet method (black)" or the like. In step S56, image data is supplied from the color separation unit 5 to the recording unit 3, and the recording operation is performed by the ink-jet method.

On the other hand, if it is determined that the original color includes the current toner color and the original is not in monochrome (e.g., full-color), the flow branches to step S57, and the control unit 8 displays, for example, a message "copying in magenta will be done by electrophotography method and in other colors by ink-jet method", which can make an operator understand the distributed colors. In step S58, the current toner color portion of the original image is supplied from the color separation unit 5 to the recording unit 2, and is recorded by the electrophotography method. Furthermore, in step S59, other color portions are supplied from the color separation unit 5 to the recording unit 3, and are recorded by the ink-jet method.

As described above, according to this embodiment, in the hybrid copying machine, the toner color of the toner cartridge set in the electrophotography recording unit is detected, and the recording method can be automatically selected depending on whether or not the input original is in monochrome and whether or not the original color coincides with the detected toner color. Therefore, a problem that a copied result recorded in red is undesirably output when a copied output recorded in black is to be obtained can be avoided, and a proper output image can be obtained independently of the color of the toner cartridge set in the recording unit 2. In addition, an operator can confirm the recording condition at that time, e.g., the correspondence between colors and the recording methods.

(Sixth Embodiment)

An image recording apparatus according to the sixth embodiment of the present invention will be described below. Note that the same reference numerals in the sixth embodiment denote substantially the same parts as in the first embodiment, and a detailed description thereof will be omitted. Also, note that the image recording apparatus of the sixth embodiment is applied to a copying machine or the like, which can record information on a single recording sheet by both the electrophotography method and the ink-jet method, and has a function of automatically discriminating one of the two methods to be used in recording. The arrangement of the apparatus of the sixth embodiment is substantially the same as that in the fifth embodiment.

Characters, line images, and the like on an original are normally expressed in black, and in order to copy sharp black characters and line images, they are preferably recorded by the electrophotography method with a high recording density. This embodiment takes this point into consideration.

FIG. 10 is a flow chart showing an example of the operation sequence executed when the start of a copying operation is instructed by the start key 23 while the recording method automatic discrimination function is enabled. This flow chart is executed by the control unit 8, and is stored in an internal ROM of the control unit 8 as a processing program.

Referring to FIG. 10, if the color separation unit 5 determines in steps S60 and S61 that the original color is a single color (monochrome, e.g., red) and coincides with the current toner color (e.g., black), the control unit 8 displays a message indicating, e.g., that "copying will be done by electrophotography method (red)", or the like in step S62, and image data is supplied from the color separation unit 5 to the recording unit 2. In step S63, electrophotography recording using the current toner color is performed.

On the other hand, if it is determined that the original is in monochrome but its color is other than the current toner color, the flow branches to step S64, and the control unit 8 displays, for example, a message "copying will be done by ink-jet method (red)". In step S65, image data is supplied from the color separation unit 5 to the recording unit 3, and is recorded by the ink-jet method.

If it is determined that the original is not in monochrome (e.g., full-color), the flow branches to step S66 to detect the current toner color. If the current toner color is black, the control unit 8 displays, for example, a message "copying will be done by electrophotography + ink-jet methods" in step S67. In step S68, image data of a black component is supplied from the color separation unit 5 to the recording unit 2, and is recorded by the electrophotography method. Image data other than the black component are supplied from the color separation unit 5 to the recording unit 3, and are recorded by the ink-jet method. On the other hand, if the current toner color is other than black, the control unit 8 displays, for example, an alarm message "please exchange to black toner cartridge" in step S69, and stops the recording operation in step S70.

As described above, according to this embodiment, in the hybrid copying machine, the toner color of the toner cartridge set in the electrophotography recording unit is detected, and the recording method can be automatically selected depending on whether or not the input original is in monochrome, whether or not the original color coincides with the detected toner color, and whether or not the toner color is black. Therefore, a problem that a copied result recorded in red is undesirably output when a copied output recorded in black is to be obtained can be avoided, and a proper output image can be obtained independently of the color of the toner cartridge set in the recording unit 2. In addition, sharp black characters, line images, and the like can be formed.

(Seventh Embodiment)

An image recording apparatus according to the seventh embodiment of the present invention will be described below. Note that the same reference numerals in the seventh embodiment denote substantially the same parts as in the first embodiment, and a detailed description thereof will be omitted. Also, note that the image recording apparatus of the seventh embodiment is applied to a copying machine or the like, which can record information on a single recording sheet by both the electrophotography method and the ink-jet method, and has a function of automatically discriminating one of the two methods to be used in recording. The arrangement of the apparatus of the seventh embodiment is substantially the same as that in the fifth embodiment.

Characters, line images, and the like on an original are normally expressed in black, and in order to copy sharp black characters and line images, they are preferably recorded by the electrophotography method with a high recording density. This embodiment takes this point into consideration.

Figure 11B:
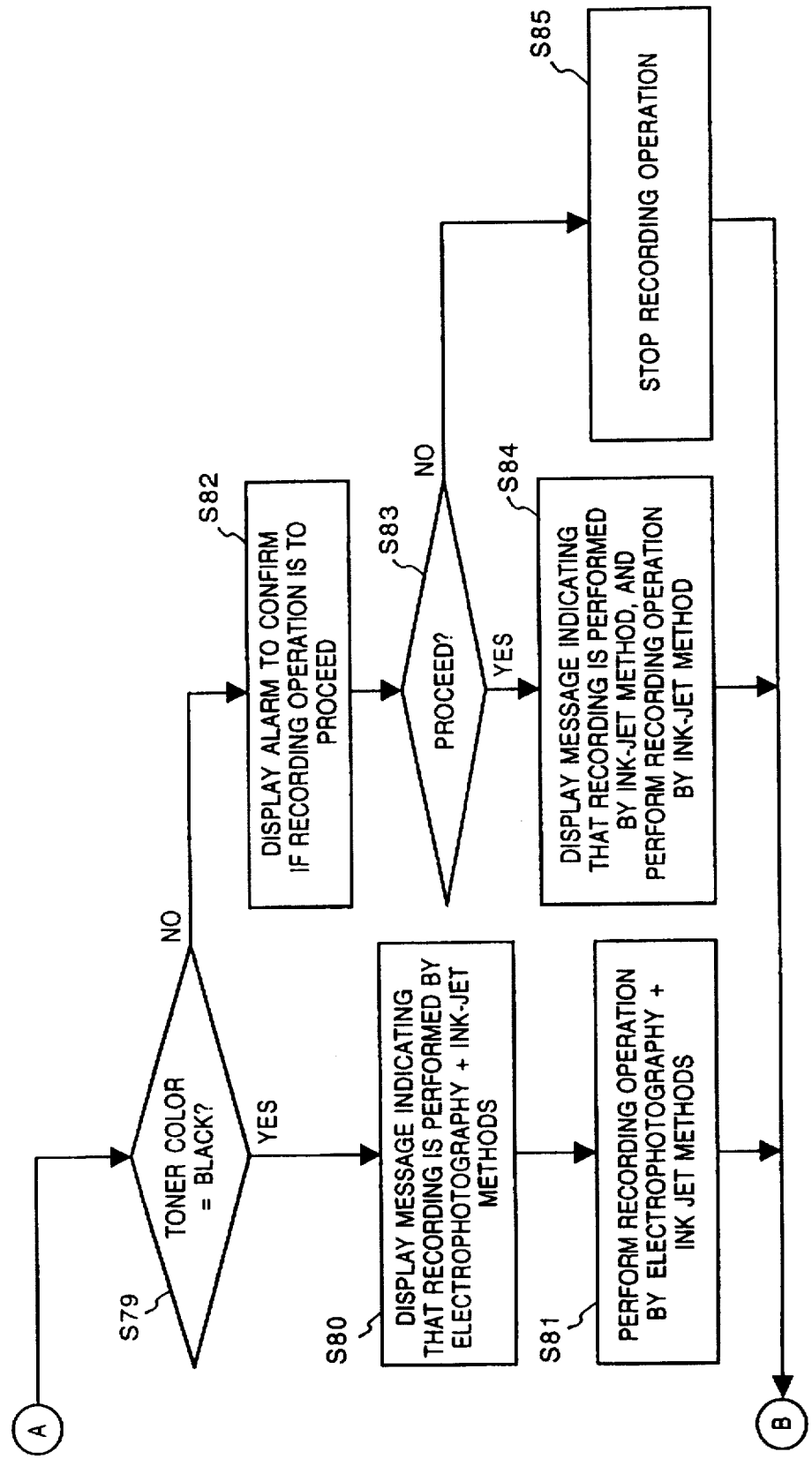

FIGS. 11A and 11B are flow charts showing an example of the operation sequence executed when the start of a copying operation is instructed by the start key 23 while the recording method automatic discrimination function is enabled. This flow chart is executed by the control unit 8, and is stored in an internal ROM of the control unit 8 as a processing program.

Referring to FIGS. 11A and 11B, if the color separation unit 5 determines in steps S71 and S72 that the original color is a single color (monochrome) and coincides with the current toner color, the control unit 8 displays a message indicating, e.g., that "copying will be done by electrophotography method (red)", or the like in step S73, and image data is supplied from the color separation unit 5 to the recording unit 2. In step S74, electrophotography recording using the current toner color is performed.

On the other hand, if it is determined that the original is in monochrome but its color is other than the current toner color, the flow branches to step S75, and the control unit 8 displays a message indicating that the original color is different from the toner color. In addition, the control unit 8 inquires the operator as to whether to proceed with the recording operation by the ink-jet method. As a message displayed in this case, for example, a message "original color is different from cartridge color. Do you want to proceed with copying by ink-jet method?" or the like is used. If the start key 23 is depressed again in step S76, image data is supplied from the color separation unit 5 to the recording unit 3 and is recorded by the ink-jet method in step S77; if the stop key 24 is depressed in step S76, the recording operation is stopped in step S78.

On the other hand, if it is determined that the original is not in monochrome (e.g., full-color), the flow branches to step S79 to detect the current toner color. If the current toner color is black, the control unit 8 displays, for example, a message "copying will be done by electrophotography + ink-jet methods" in step S80. In step S81, image data of a black component is supplied from the color separation unit 5 to the recording unit 2, and is recorded by the electrophotography method using the black toner. Image data other than the black component are supplied from the color separation unit 5 to the recording unit 3, and are recorded by the ink-jet method. On the other hand, if the current toner color is other than black, the flow branches to step S82, and the control unit 8 displays a message indicating that the black toner cartridge is not set. In addition, the control unit 8 inquires the operator as to whether to proceed with the recording operation by the ink-jet method. As a message displayed in this case, for example, a message "black toner cartridge is not set. Do you want to proceed with copying by only ink-jet method?" is used. If the start key 23 is depressed again in step S83, the image data is supplied from the color separation unit 5 to the recording unit 3 and is recorded by the ink-jet method in step S84; if the stop key 24 is depressed in step S83, the recording operation is stopped in step S85.

As described above, according to this embodiment, in the hybrid copying machine, the toner color of the toner cartridge set in the electrophotography recording unit is detected, the recording method can be automatically selected depending on whether or not the input original is in monochrome, whether or not the original color coincides with the detected toner color, and whether or not the toner color is black, and an alarm & proceeding confirmation message can be displayed. Therefore, a problem that a copied result recorded in red is undesirably output when a copied output recorded in black is to be obtained can be avoided, and sharp black characters, line images, and the like can be formed. Furthermore, when a toner cartridge matching the original color is not set, when the black toner cartridge is not set, when an operator does not want to exchange the toner cartridge, or the like, a copied output corresponding to the original color can be obtained by the ink-jet method, or the copying operation can be stopped.

(Eighth Embodiment)

An image recording apparatus according to the eighth embodiment of the present invention will be described below. Note that the same reference numerals in the eighth embodiment denote substantially the same parts as in the first embodiment, and a detailed description thereof will be omitted. Also, note that the image recording apparatus of the eighth embodiment is applied to a copying machine or the like, which can record information on a single recording sheet by both the electrophotography method and the ink-jet method, and has a function of automatically discriminating one of the two methods to be used in recording. The arrangement of the apparatus of the eighth embodiment is substantially the same as that in the fifth embodiment.

Characters, line images, and the like on an original are normally expressed in black, and in order to copy sharp black characters and line images, they are preferably recorded by the electrophotography method with a high recording density. This embodiment takes this point into consideration.

Figure 12:
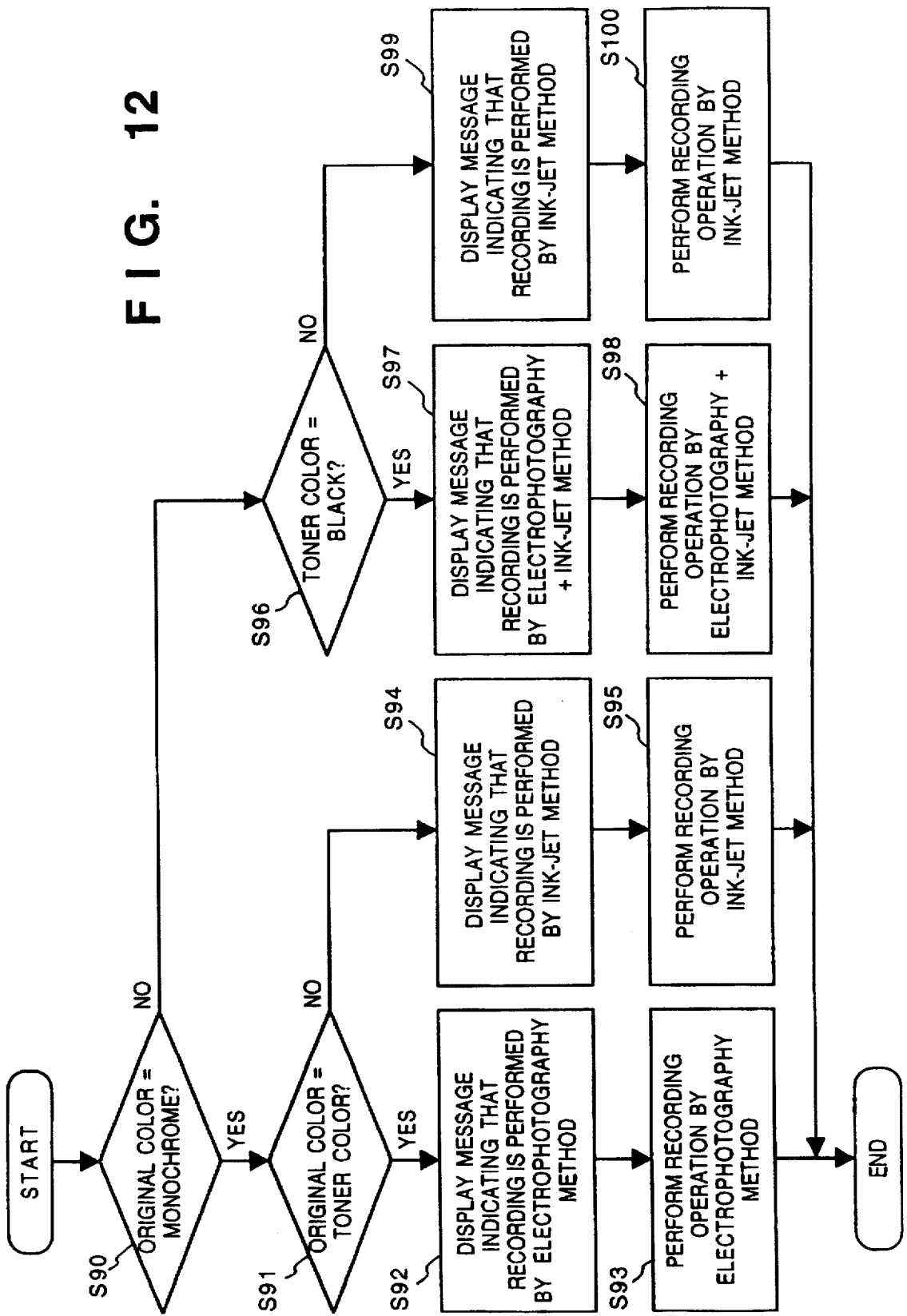
FIG. 12 is a flow chart showing an example of a copying operation sequence of the eighth embodiment.

FIG. 12 is a flow chart showing an example of the operation sequence executed when the start of a copying operation is instructed by the start key 23 while the recording method automatic discrimination function is selected. This flow chart is executed by the control unit 8, and is stored in an internal ROM of the control unit 8 as a processing program.

Referring to FIG. 12, if the color separation unit 5 determines in steps S90 and S91 that the original color is a single color (monochrome) and coincides with the current toner color, the control unit 8 displays a message indicating, e.g., that "copying will be done by electrophotography method (red)", or the like in step S92, and image data is supplied from the color separation unit 5 to the recording unit 2. In step S93, electrophotography recording using the current toner color is performed.

On the other hand, if it is determined that the original is in monochrome but its color is not the current toner color, the flow branches to step S94, and the control unit 8 displays a message indicating that the original color is different from the toner color, e.g., a message "original color is different from toner cartridge color. Copying will be done by ink-jet method", or the like. In step S95, image data is supplied from the color separation unit 5 to the recording unit 3, and is recorded by the ink-jet method.

On the other hand, if it is determined that the original is not in monochrome (e.g., full-color), the flow branches to step S96 to detect the current toner color. If the current toner color is black, the control unit 8 displays, for example, a message "copying will be done by electrophotography + ink-jet methods" in step S97. In step S98, image data of a black component is supplied from the color separation unit 5 to the recording unit 2, and is recorded by the electrophotography method using black toner. Image data other than the black component are supplied from the color separation unit 5 to the recording unit 3, and are recorded by the ink-jet method. On the other hand, if the current toner color is other than black, the flow branches to S99, and the control unit 8 displays a message indicating that the black toner cartridge is not set, and a message indicating that the recording operation is to proceed by the ink-jet method. As the message displayed in this case, a message "black toner cartridge is not set. Copying will be done by ink-jet method" or the like is used. In step S100, image data is supplied from the color separation unit 5 to the recording unit 3, and is recorded by the ink-jet method.

As described above, according to this embodiment, in the hybrid copying machine, the toner color of the toner cartridge set in the electrophotography recording unit is detected, and a suitable recording method can be automatically selected depending on whether or not the input original is in monochrome, whether or not the original color coincides with the detected toner color, and whether or not the toner color is black. Therefore, a problem that a copied result recorded in red is undesirably output when a copied output recorded in black is to be obtained can be avoided, and sharp black characters, line images, and the like can be formed. Furthermore, when a toner cartridge matching the original color is not set, when the black toner cartridge is not set, when an operator does not want to exchange the toner cartridge, or the like, a copied output corresponding to the original color can be obtained by the ink-jet method.

(Ninth Embodiment)

Figure 13:
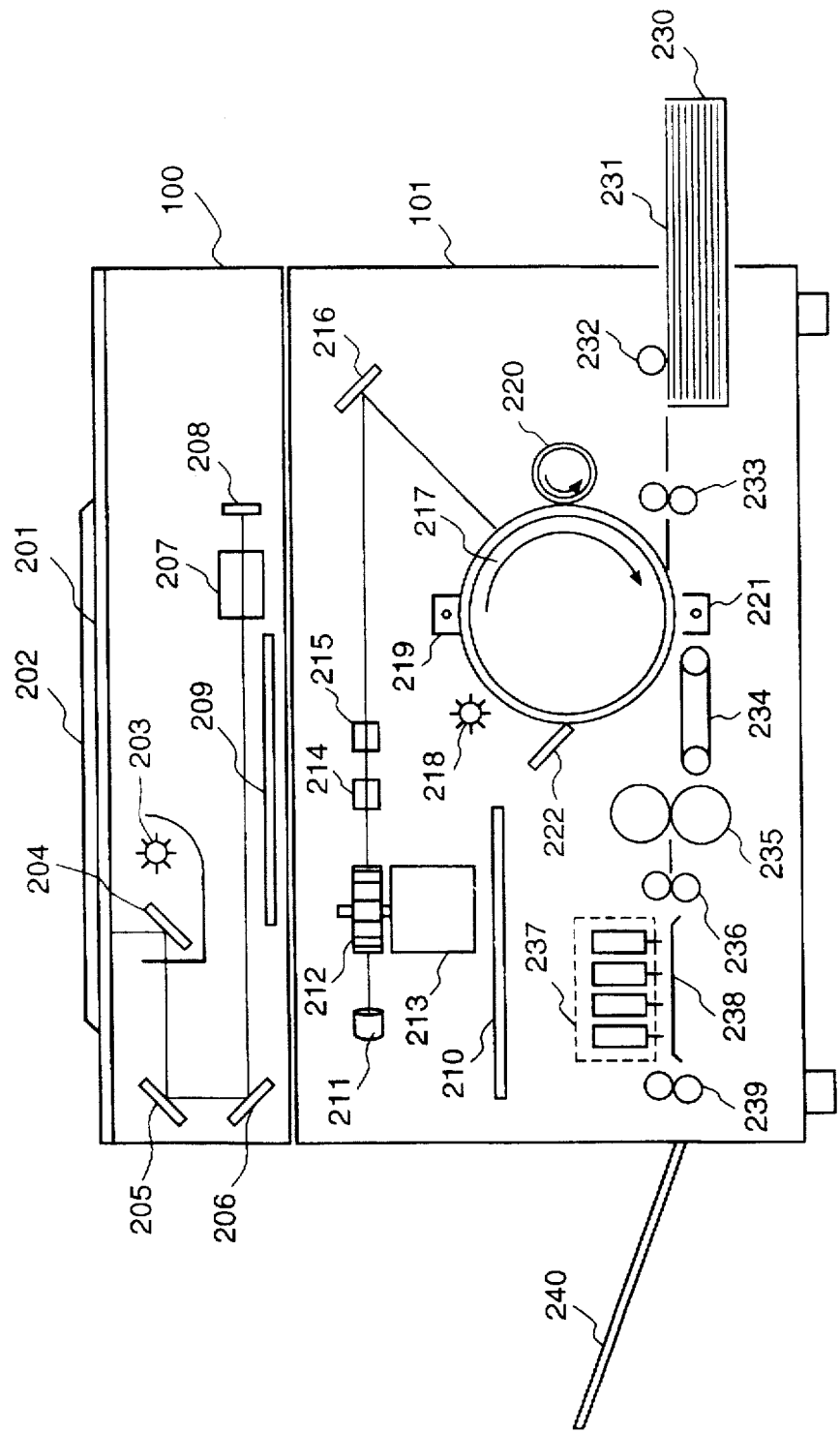
FIG. 13 is a sectional view of a color copying machine according to the ninth embodiment of the present invention.

FIG. 13 is a sectional view of a hybrid color copying machine to which this embodiment is applied, and this copying machine comprises a color image reading unit 100 as an example of image information input means, and an image forming unit 101.

In the color image reading unit 100, reference numeral 201 denotes an original table glass; 202, an original pressing plate for pressing an original placed on the original table glass 201; 203, a halogen lamp for illuminating an original; 204, 205, and 206, mirrors for imaging light reflected by an original illuminated by the halogen lamp 203 onto a color image sensor 208; 207, an imaging lens arranged in the optical system; and 209, an image processing unit for converting image information photoelectrically converted by the color image sensor 208 into a digital signal, performing various kinds of correction operations to faithfully realize an original, and detecting an image portion having a predetermined feature in a color image region.

The image forming unit 101 is characterized by comprising two image forming units of the electrophotography method and the ink-jet method. Reference numeral 210 denotes an image formation control unit for generating signals for driving a semiconductor laser 211, and ink-jet heads 237 on the basis of image data which has been subjected to predetermined correction in the image reading unit 100. Reference numeral 212 denotes a rotary polygonal mirror for scanning a laser beam emitted by the semiconductor laser 211 onto a photosensitive drum 217; 213, a DC motor for rotating the rotary polygonal mirror 212. The rotary polygonal mirror 212 is attached to the shaft of the DC motor 213. Reference numeral 216 denotes a mirror for irradiating a laser beam scanned by the rotary polygonal mirror 212 onto the photosensitive drum 217 via lenses 214 and 215; 218, a charge removal lamp for removing any residual charge on the photosensitive drum 217; 219, a corona charger for generating a minus charge on the surface of the photosensitive drum 217; 220, a developer for visualizing an electrostatic latent image formed on the photosensitive drum by the laser beam with toner; 221, a transfer charger for transferring the visualized original image onto a recording sheet 230, which is fed from a cassette 231 via a paper feed roller 232 and convey rollers 233; 222, a cleaner for cleaning and recovering any residual toner on the photosensitive drum 217; 234, a convey belt for conveying the recording sheet 230 on which an image is transferred; and 235, fixing rollers for fixing the toner image on the surface of the conveyed recording sheet 230. Furthermore, the recording sheet 230 on which the toner image has been fixed is conveyed to an ink-jet recording unit via convey rollers 236. Reference numeral 237 denotes ink-jet heads for recording an original image in full color by ejecting inks onto the recording sheet 230. These ink-jet heads respectively correspond to cyan (C), magenta (M), yellow (Y), and black (K) as ink recording colors. Reference numeral 238 denotes a platen arranged at a position facing the ink-jet heads 237; 239, exhaust rollers for exhausting the recording sheet 230 outside the apparatus; and 240, an exhaust tray for receiving the exhausted recording sheet 230.

In the color image reading unit 100, in a state wherein an original is placed on the original table glass 201, the original is illuminated by the halogen lamp 203, and the original surface is scanned by optical system members. At this time, light reflected by the original surface is imaged on the color image sensor 208 via the mirrors 204, 205, and 206, and the imaging lens 207. Red (R), green (G), and blue (B) filters are formed on the light-receiving surface of the color image sensor 208, and are arranged at a predetermined sensor cell pitch (in this embodiment, 400 dpi). The color image sensor 208 converts the reflected light from the original surface into electrical signals of three, R, G, and B color components, which are converted into 8-bits digital signals by an A/D converter (not shown). These digital signals are then supplied to the image processing unit 209.

Figure 14:
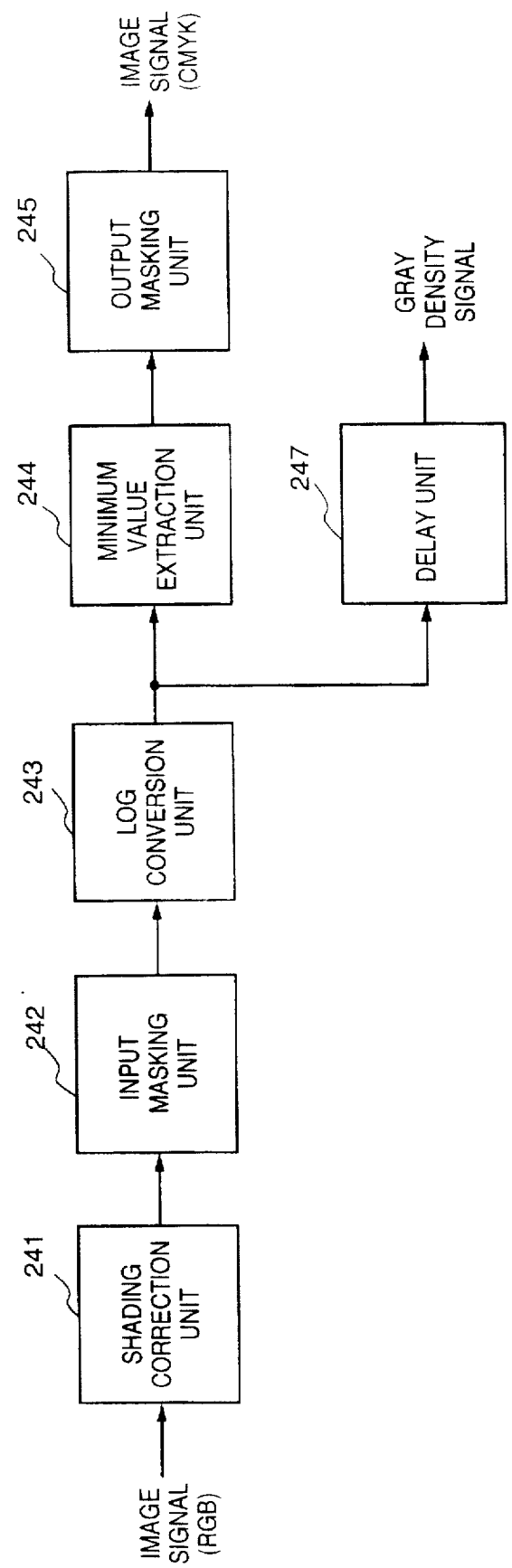
FIG. 14 is a block diagram showing the detailed arrangement of an image processing unit of the ninth embodiment.

FIG. 14 shows the detailed arrangement of the image processing unit 209.

Referring to FIG. 14, the R, G, and B digital image signals input to the image processing unit 209 are subjected to characteristic correction of the reading optical system in a shading correction unit 241, so that the lightest image signal becomes FFH and the darkest image signal becomes 00H. The shading-corrected image signals are subjected to sensitivity correction of the color separation filters of the color image sensor 208 in an input masking unit 242, and are output as R, G, and B (8-bits) normalized signals. The input masking unit 242 generates and outputs a luminance signal representing the luminance information of an original on the basis of the input image signals. The R, G, and B normalized image signals and the luminance signals are converted by a log conversion unit 243 into C (cyan), M (magenta), and Y (yellow) signals representing density information in units of color components, and a gray density signal based on the luminance signal. Note that the gray signal assumes a smaller value as the luminance signal is larger.

The image signals converted into the C, M, and Y (8-bits) image signals are input to a minimum value extraction unit 244, and minimum value Min(C, M, Y) is selected from the C, M, and Y image signals in units of pixels. The image signals are supplied to the subsequent processing in the form of signals C, M, Y, and Min(C, M, Y) with the selected minimum values Min(C, M, Y) as undercolor signals. The image signals added with the minimum value signals Min(C, M, Y) are subjected to correction corresponding to the color development characteristics of inks by an output masking unit 245 so as to be converted into C, M, Y, and K (black) image signals of four colors. These signals are supplied to the image formation control unit 210 of the image forming unit 101.

On the other hand, the gray density signal is delayed by a delay unit 247 by a period corresponding to that required for outputting the C, M, Y, and K image signals of four colors from the output masking unit 245, and the delayed signal is supplied to the image formation control unit 210.

Figure 15:
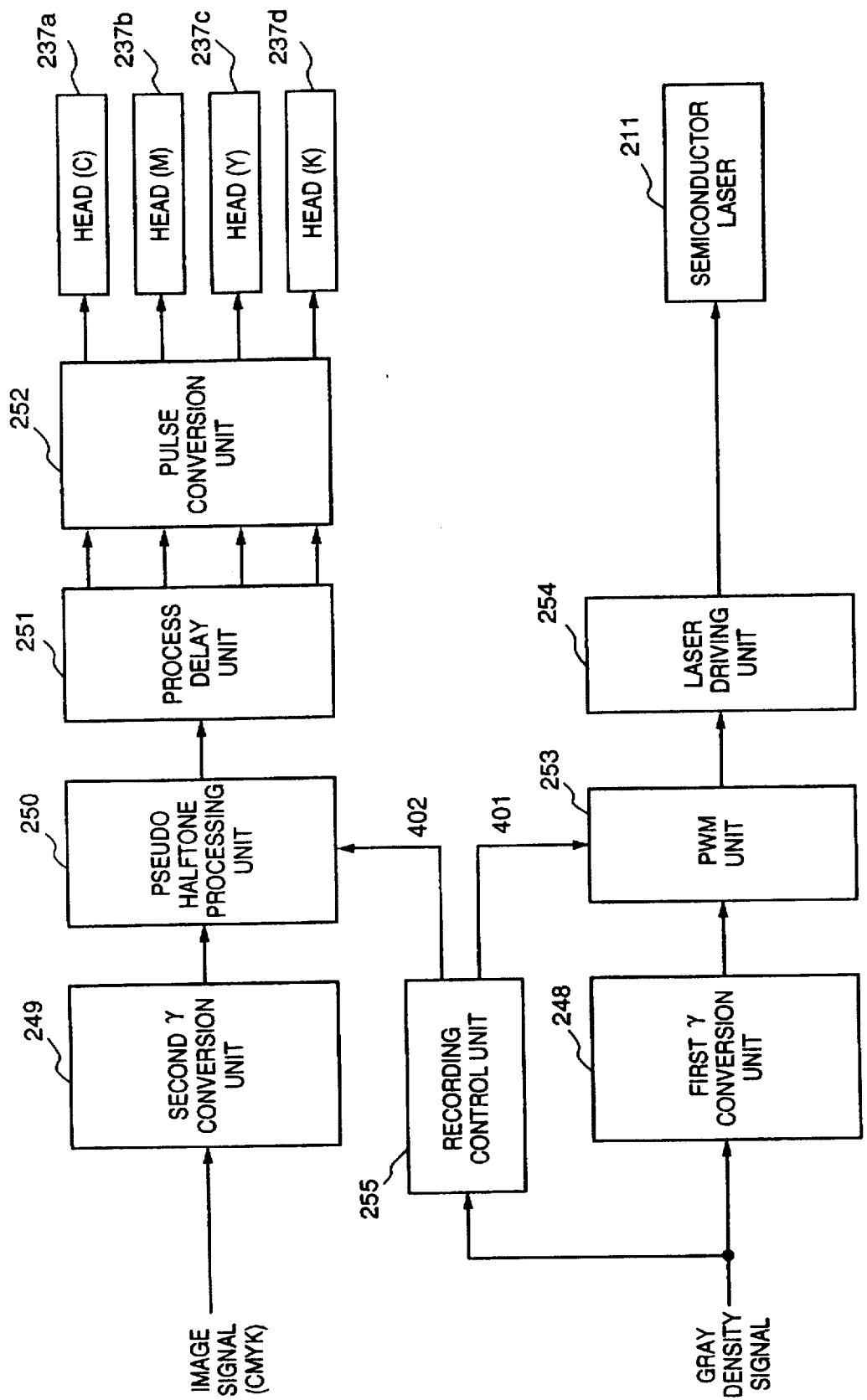
FIG. 15 is a block diagram showing the detailed arrangement of an image formation control unit of the ninth embodiment.

FIG. 15 shows the detailed arrangement of the image formation control unit 210.

The gray density signal supplied from the image processing unit 209 is γ-converted to have a density, which is set in advance by a user, by a first γ conversion unit 248, and the converted signal is converted into a pulse width corresponding to its density level by a PWM unit 253. The pulse signal generated by the PWM unit 253 is converted by a laser driving unit 254 into a signal for driving the semiconductor laser 211, and a latent image is formed on the photosensitive drum 217 by a laser beam output from the semiconductor laser 211. Thereafter, development, transfer, and fixing processes are performed in accordance with the above-mentioned electrophotography process, thus forming an image on the recording sheet 230.

On the other hand, the C, M, Y, and K image signals supplied from the image processing unit 209 are γ-converted to have a density and a color balance which are set in advance by the user, by a second γ conversion unit 249. The converted signals are then subjected to known pseudo halftone processing (e.g., the ordered dither method, the error diffusion method, or the like) by a pseudo halftone processing unit 250 to be converted into image signals each having a predetermined number of bits (in this embodiment, 1 bit). The image signals subjected to the pseudo halftone processing are delayed by times corresponding to the intervals between the ink-jet heads 237a to 237d corresponding to C, M, Y, and K colors in a process delay unit 251, and the delayed signals are converted into head driving pulses by a pulse conversion unit 252. These driving pulses drive the ink-jet heads 237 to eject C, M, Y, and K inks onto the recording sheet 230, thus forming a full-color image.

Note that reference numeral 255 in FIG. 15 denotes a recording control unit, which performs control as the characteristic feature of this embodiment for the above-mentioned PWM unit 253 and the pseudo halftone processing unit 250. The recording control in the recording control unit 255 will be described in detail later.

As described above, the color copying machine of this embodiment performs recording/reproduction of original information by sequentially visualizing original information read by the color image sensor 208 by the electrophotography method and/or the ink-jet method.

The recording control unit 255 as the characteristic feature of this embodiment will be explained below.

Figure 16:
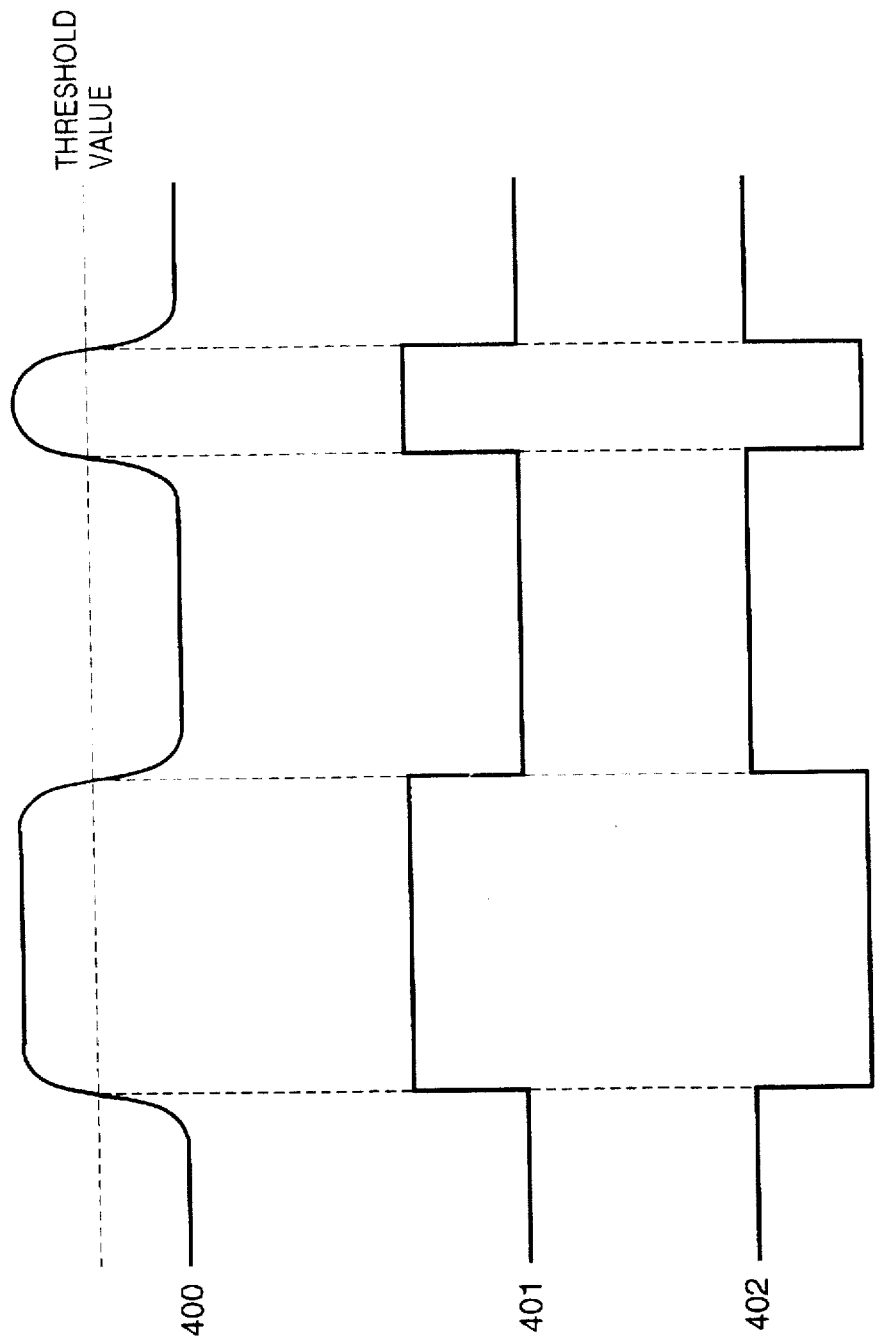
FIG. 16 is a timing chart showing the relationship between the image information and the control signal in a recording control unit of the ninth embodiment.

FIG. 16 shows the relationship between input image information 400 (gray density signal) and control signals 401 and 402 generated based on a predetermined threshold value in the recording control unit 255. The control signal 401 is input to the PWM unit 253 shown in FIG. 15, and serves as a permission signal for image formation by the electrophotography method. On the other hand, the control signal 402 is input to the pseudo halftone processing unit 250, and serves as a permission signal for image formation by the ink-jet method. Note that these control signals permit image formation when they are at H level, and inhibit image formation when they are at L level.

Figure 17:
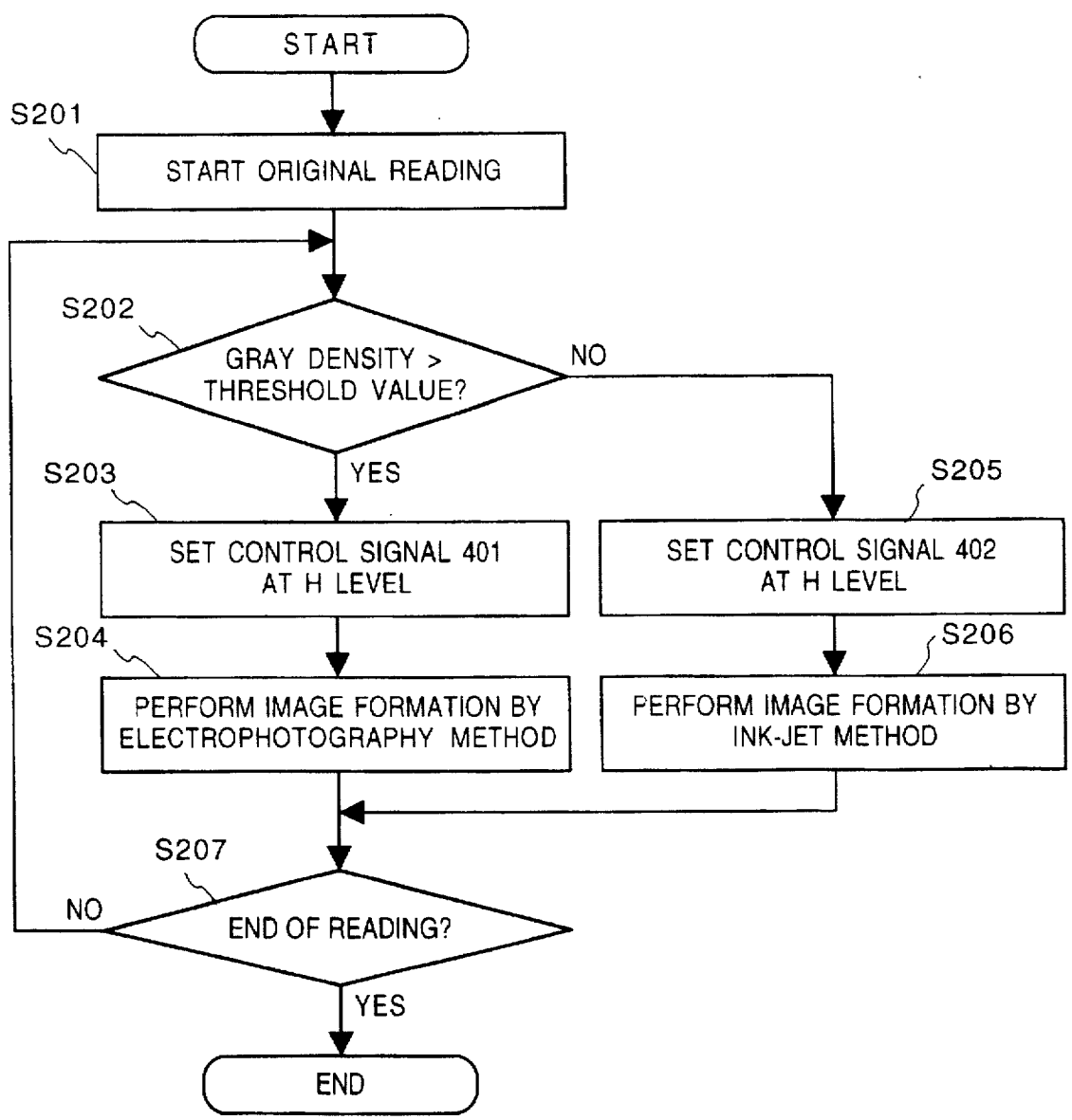
FIG. 17 is a flow chart showing an image formation control sequence of the ninth embodiment.

FIG. 17 is a flow chart showing the recording control processing sequence by the control signals shown in FIG. 16 in the recording control unit 255. Note that the processing shown in the flow chart of FIG. 17 is stored as a processing program in a ROM (not shown), and the processing program is read out and executed by a CPU (not shown).

When a reading operation of an original is started by the color image reading unit 100 in step S201, the recording control unit 255 compares image information (gray density signal) supplied from the color image reading unit 100 with a predetermined threshold value which is set in advance (step S202). As a result of comparison, if the gray density signal is larger than the threshold value, the flow advances to step S203, and the recording control unit 255 sets the control signal 401 shown in FIG. 16 at H level and the control signal 402 therein at L level. In step S204, the control signal 401 is supplied to the PWM unit 253, thus controlling image formation by the electrophotography method.

On the other hand, if it is determined in step S202 that the gray density signal is equal to or smaller than the threshold value, the flow advances to step S205, and the recording control unit 255 sets the control signal 402 shown in FIG. 16 at H level and the control signal 401 therein at L level. In step S206, the control signal 402 is supplied to the pseudo halftone processing unit 250, thus controlling image formation by the ink-jet method.

Thereafter, an image is sequentially formed in accordance with the above-mentioned procedure in steps S202 to S206 until the original reading operation is completed in step S207.

As described above, according to this embodiment, when the gray signal is larger than the predetermined threshold value, it is determined that the corresponding region is a character or solid black portion, and image formation is performed by only the electrophotography method; otherwise, image formation is performed by only the ink-jet method. Therefore, since no region is subjected to image formation by both the electrophotography method and the ink-jet method, image formation with good character/thin line reproducibility can be realized.

The arrangement of the image formation control unit 210 in this embodiment is not limited to that shown in FIG. 15 described above. Other arrangements of the image formation control unit 210 in this embodiment will be described below.

(First Modification in Ninth Embodiment)

Figure 18:
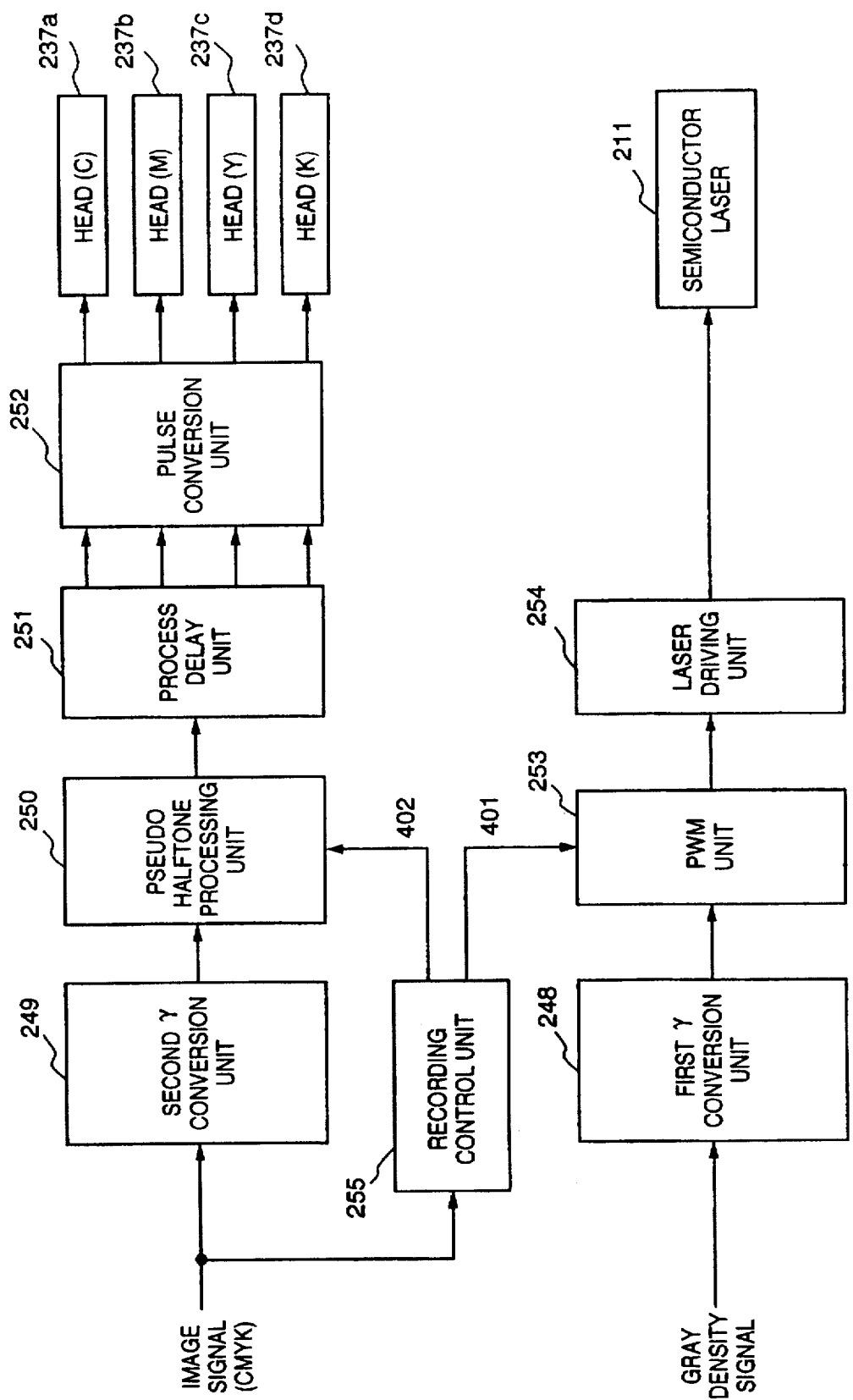
FIG. 18 is a block diagram showing the detailed arrangement of the image formation control unit according to the first modification of the ninth embodiment.

FIG. 18 shows the second arrangement of the image formation control unit 210. The same reference numerals in FIG. 18 denote the same parts as in FIG. 15 above, and a detailed description thereof will be omitted. As the characteristic feature of the arrangement shown in FIG. 18, an image signal input to the recording control unit 255 is C, M, Y, and K full-color signals.

Figure 19:
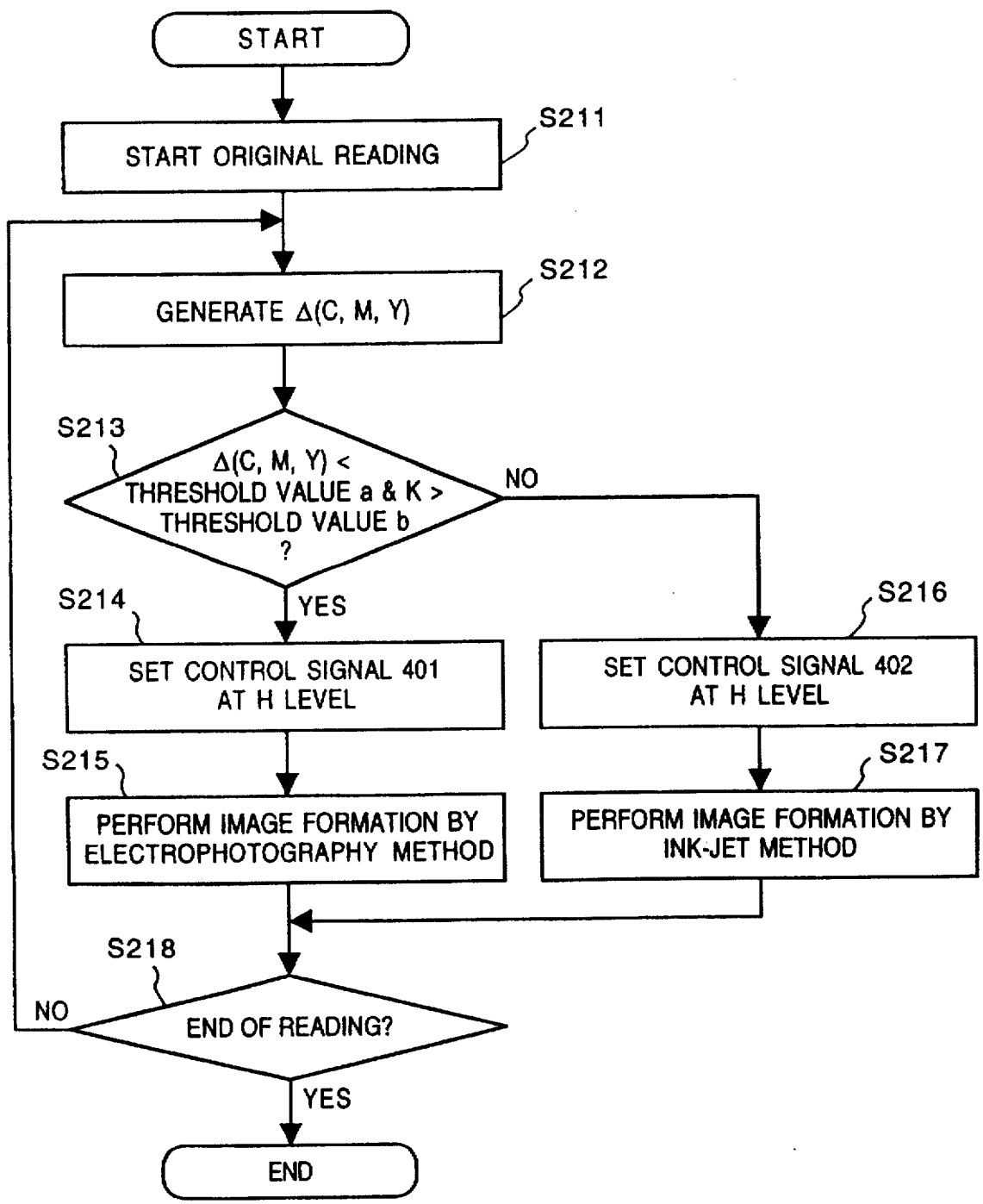
FIG. 19 is a flow chart showing the image formation control sequence in the first modification of the ninth embodiment.

FIG. 19 is a flow chart showing the recording control processing sequence of the recording control unit 255 shown in FIG. 18. Note that the processing shown in the flow chart of FIG. 19 is stored as a processing program in a ROM (not shown), and the processing program is read out and executed by a CPU (not shown).

When the original reading operation is started in step S211, the recording control unit 255 generates a difference value $\Delta$(C, M, Y) between the maximum and minimum values of C, M, and Y data from the image signals (C, M, Y, K) supplied from the image reading unit 100 in step S212. In step S213, the recording control unit 255 compares the difference value $\Delta$(C, M, Y) with a predetermined threshold value a, and K data with a predetermined threshold value b. If $\Delta$(C, M, Y)<a and K>b are satisfied, the control unit 255 sets the control signal 401 at H level and the control signal 402 at L level in step S214. In step S215, the control signal 401 is supplied to the PWM unit 253, thus controlling image formation by the electrophotography method.

On the other hand, if the above-mentioned conditions are not satisfied in step S213, the control unit 255 sets the control signal 402 at H level and the control signal 401 at L level in step S216. In step S217, the control signal 402 is delayed by a predetermined period of time by a delay unit (not shown), and the delayed signal is supplied to the pseudo halftone processing unit 250, thus controlling image formation by the ink-jet method. Thereafter, an image is sequentially formed in accordance with the above-mentioned procedure in steps S212 to S217 until the original reading operation is completed in step S218.

As described above, according to this modification, when the region of interest of an input full-color image has small $\Delta$(C, M, Y), i.e., an achromatic color, and has a large K component, i.e., a high density, it is determined that this region corresponds to a character or solid black portion, and toner recording by the electrophotography method is performed. More specifically, region discrimination is performed based on the C, M, Y, and K full-color density signals, thereby controlling the recording method.

(Second Modification in Ninth Embodiment)

Figure 20:
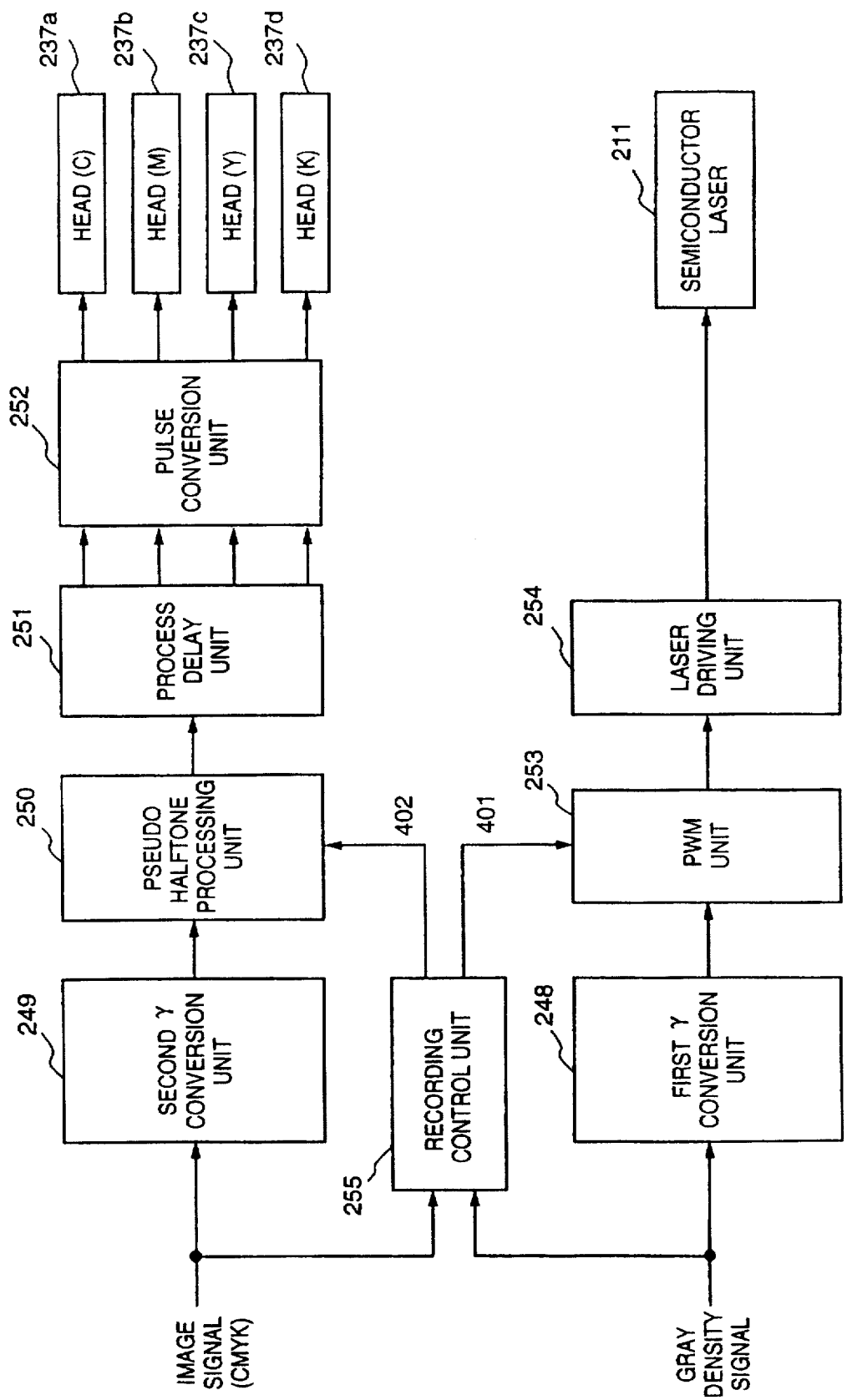
FIG. 20 is a block diagram showing the detailed arrangement of the image formation control unit according to the second modification of the ninth embodiment.

FIG. 20 shows the third arrangement of the image formation control unit 210. The same reference numerals in FIG. 20 denote the same parts as in FIG. 15 above, and a detailed description thereof will be omitted. As the characteristic feature of the arrangement shown in FIG. 20, an image signal input to the recording control unit 255 is both the gray density signal and the C, M, Y, and K signals.

Figure 21:
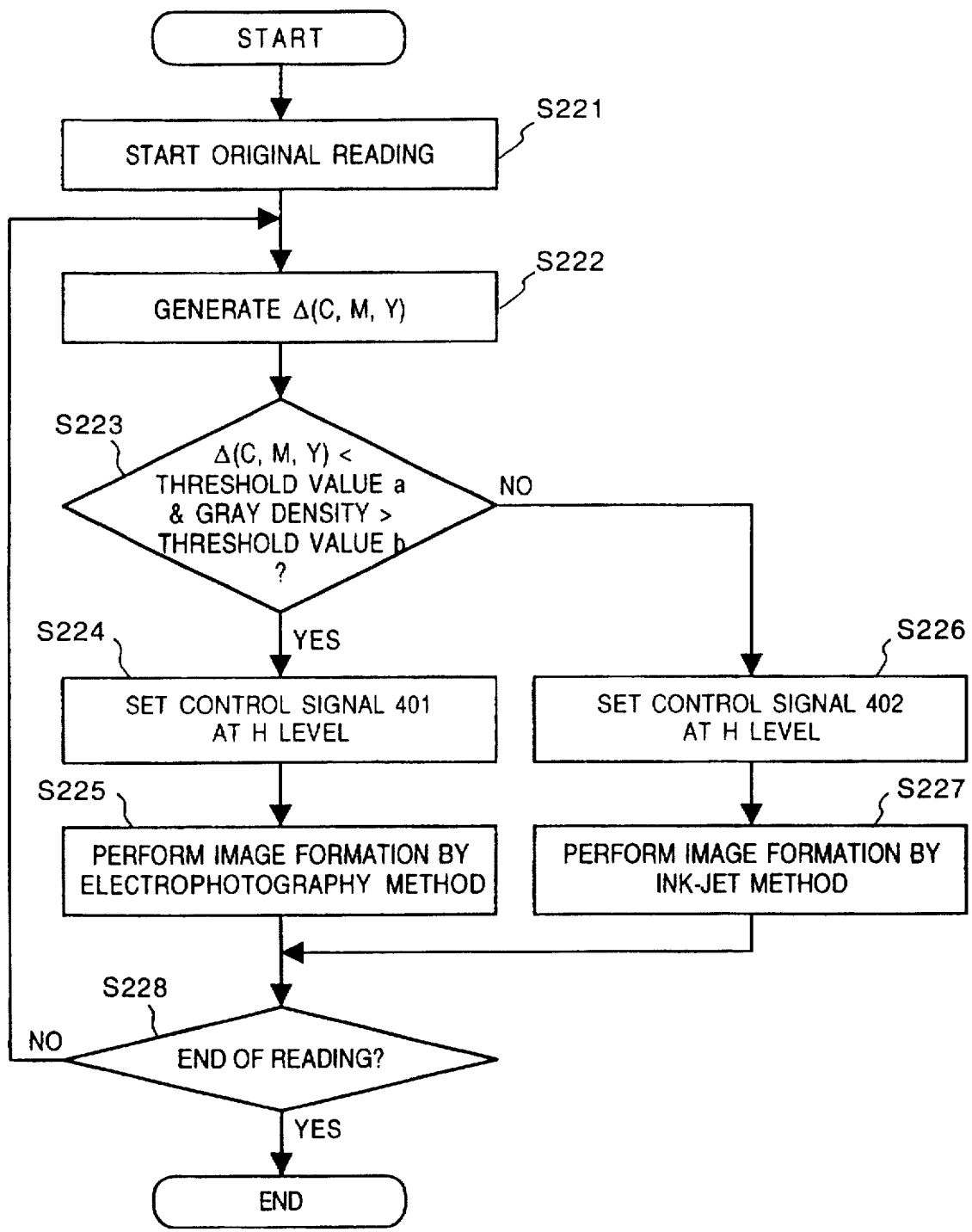
FIG. 21 is a flow chart showing the image formation control sequence in the second modification of the ninth embodiment.

FIG. 21 is a flow chart showing the recording control processing sequence of the recording control unit 255 shown in FIG. 20. Note that the processing shown in the flow chart of FIG. 21 is stored as a processing program in a ROM (not shown), and the processing program is read out and executed by a CPU (not shown).

When an original reading operation is started in step S221, the recording control unit 255 generates a difference value $\Delta$(C, M, Y) between the maximum and minimum values of C, M, and Y data from the image signals (C, M, Y, K) supplied from the image reading unit 100 in step S222. In step S223, the recording control unit 255 compares the difference value $\Delta$(C, M, Y) with a predetermined threshold value a, and the gray density signal supplied from the image reading unit 100 with a predetermined threshold value b. If $\Delta$(C, M, Y)<a and the gray density signal>b are satisfied, the control unit 255 sets the control signal 401 at H level and the control signal 402 at L level in step S224. In step S225, the control signal 401 is supplied to the PWM unit 253, thus controlling image formation by the electrophotography method.

On the other hand, if the above-mentioned conditions are not satisfied in step S223, the control unit 255 sets the control signal 402 at H level and the control signal 401 at L level in step S226. In step S227, the control signal 402 is delayed by a predetermined period of time by a delay unit (not shown), and the delayed signal is supplied to the pseudo halftone processing unit 250, thus controlling image formation by the ink-jet method. Thereafter, an image is sequentially formed in accordance with the above-mentioned procedure in steps S222 to S227 until the original reading operation is completed in step S228.

As described above, according to this modification, when the region of interest of an input full-color image has small $\Delta$(C, M, Y), i.e., an achromatic color, and has a large gray density, i.e., a high density, it is determined that this region corresponds to a character or solid black portion, and toner recording by the electrophotography method is performed. More specifically, region discrimination is performed based on both the C, M, Y, and K full-color density signals and the gray signal, thereby controlling the recording method.

As described above, according to this embodiment, the image formation operations by the electrophotography method and the ink-jet method can be controlled to be switched in correspondence with the black density value (gray density or K component) of the input image signals without using a fixed arrangement of the image formation control unit 210. Therefore, a single region can be prevented from being recorded by both the black toner and the black ink (obtained by mixing C, M, and Y), thus preventing deterioration of image quality.

In the three arrangements of this embodiment, the predetermined threshold value is set in advance. For example, a value calculated by a statistical calculation from image information in a predetermined area including the point of interest may be used as a threshold value.

As can be seen from FIG. 16, the inverted signal of the control signal 401 may be used as the control signal 402.

(10th Embodiment)

The 10th embodiment according to the present invention will be explained below.

The apparatus arrangement in the 10th embodiment is the same as that shown in FIGS. 13 to 15 of the above-mentioned ninth embodiment, and a detailed description thereof will be omitted.

Figure 22:
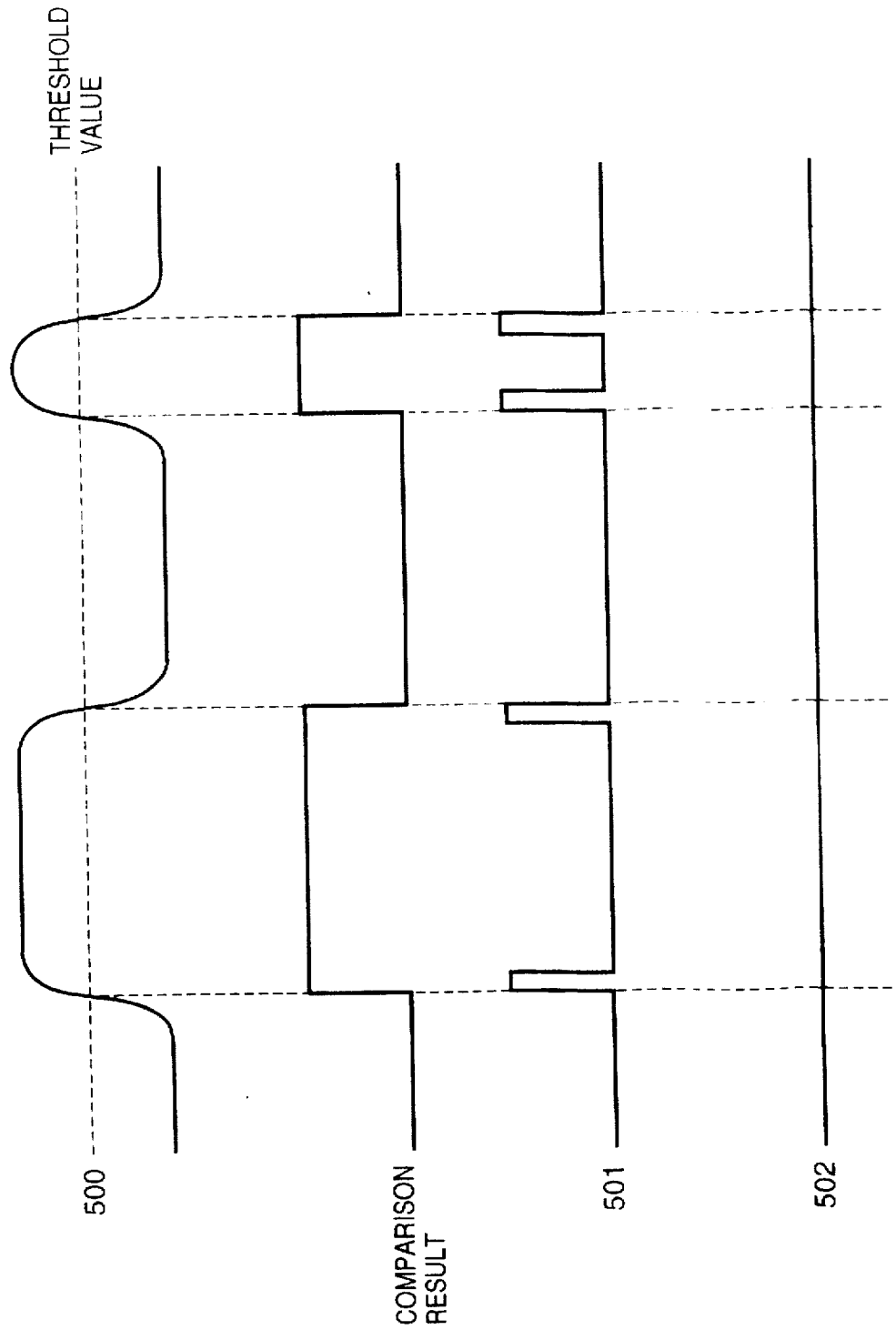
FIG. 22 is a timing chart showing the relationship between the image information and the control signal in a recording control unit of the 10th embodiment.

FIG. 22 shows the relationship between input image information 500 (gray density signal) and control signals 501 and 502 generated on the basis of a predetermined threshold value in the recording control unit 255 of the 10th embodiment. The control signal 501 is input to the PWM unit 253 shown in FIG. 15, and serves as a permission signal for image formation by the electrophotography method. On the other hand, the control signal 502 is input to the pseudo halftone processing unit 250, and serves as a permission signal for image formation by the ink-jet method. Note that these control signals permit image formation when they are at H level, and inhibit image formation when they are at L level.

In the 10th embodiment, as can be seen from FIG. 22, the control signal 501 changes to H level at only the edge portions of a portion where the comparison result between the image information 500 and the predetermined threshold value changes to H level. On the other hand, the control signal 502 is always controlled to be H level. Therefore, in the 10th embodiment, input image information is always reproduced by the ink-jet method, and the boundary region (edge portion) of a region having a predetermined level in the image is subjected to image formation by the electrophotography method.

Figure 23:
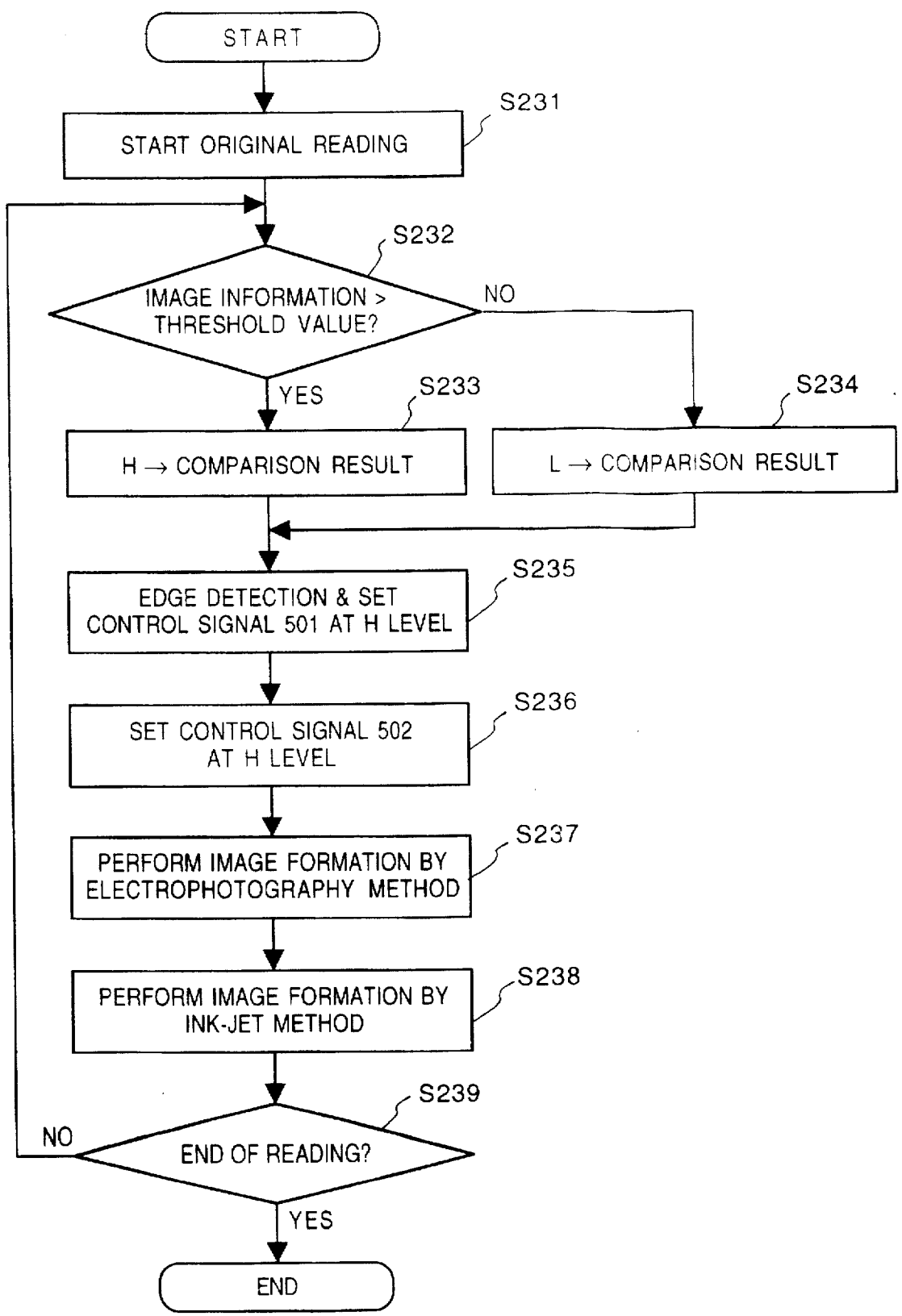
FIG. 23 is a flow chart showing the image formation control sequence of the 10th embodiment.

FIG. 23 is a flow chart showing the recording control in the recording control unit 255 of the 10th embodiment. Note that the processing shown in the flow chart of FIG. 23 is stored in, e.g., a ROM (not shown) as a processing program, and the processing program is read out and executed by a CPU (not shown).

When an original reading operation is started in step S231, the recording control unit 255 compares image information supplied from the image reading unit 100 with a predetermined threshold value, which is set in advance (step S232). As a result of comparison in step S232, if the image information is larger than the threshold value, a 1-bit signal representing the comparison result is set at H level in step S233; otherwise, a 1-bit signal representing the comparison result is set at L level in step S234.

The flow then advances to step S235, a signal representing an edge portion (corresponding to a width of one to three pixels) is extracted from a period where the signals representing the comparison results are set at H level, and the control signal 501 is set at H level in correspondence with the extracted signal. More specifically, as for signals other than the signal of the edge portion, the control signal 501 is set at L level irrespective of the levels of the signals representing the comparison result. In step S236, the control signal 502 is set at H level. In step S237, the control signal 501 is supplied to the PWM unit 253 to control image formation by the electrophotography method. In step S238, image formation by the ink-jet method is controlled.

Note that an image is sequentially formed in accordance with the above-mentioned procedure in steps S232 to S238 until the original reading operation is completed in step S239.

As described above, according to the 10th embodiment, input image information is always reproduced by the ink-jet method, and the boundary region (edge portion) of a region having a predetermined level in the image is subjected to image formation by the electrophotography method. More specifically, only the edge portion of a solid black portion is emphasized by toner. Therefore, an image blur of the edge portion caused by ink smearing inherent to the ink-jet method can be eliminated, and high-quality image formation can be attained.

In the 10th embodiment as well, other arrangements of the image formation control unit 210 can be adopted as in the ninth embodiment described above.

(11th Embodiment)

The 11th embodiment according to the present invention will be described below.

The apparatus arrangement in the 11th embodiment is the same as that shown in FIGS. 13 to 15 of the above-mentioned ninth embodiment, and a detailed description thereof will be omitted.

Figure 24:
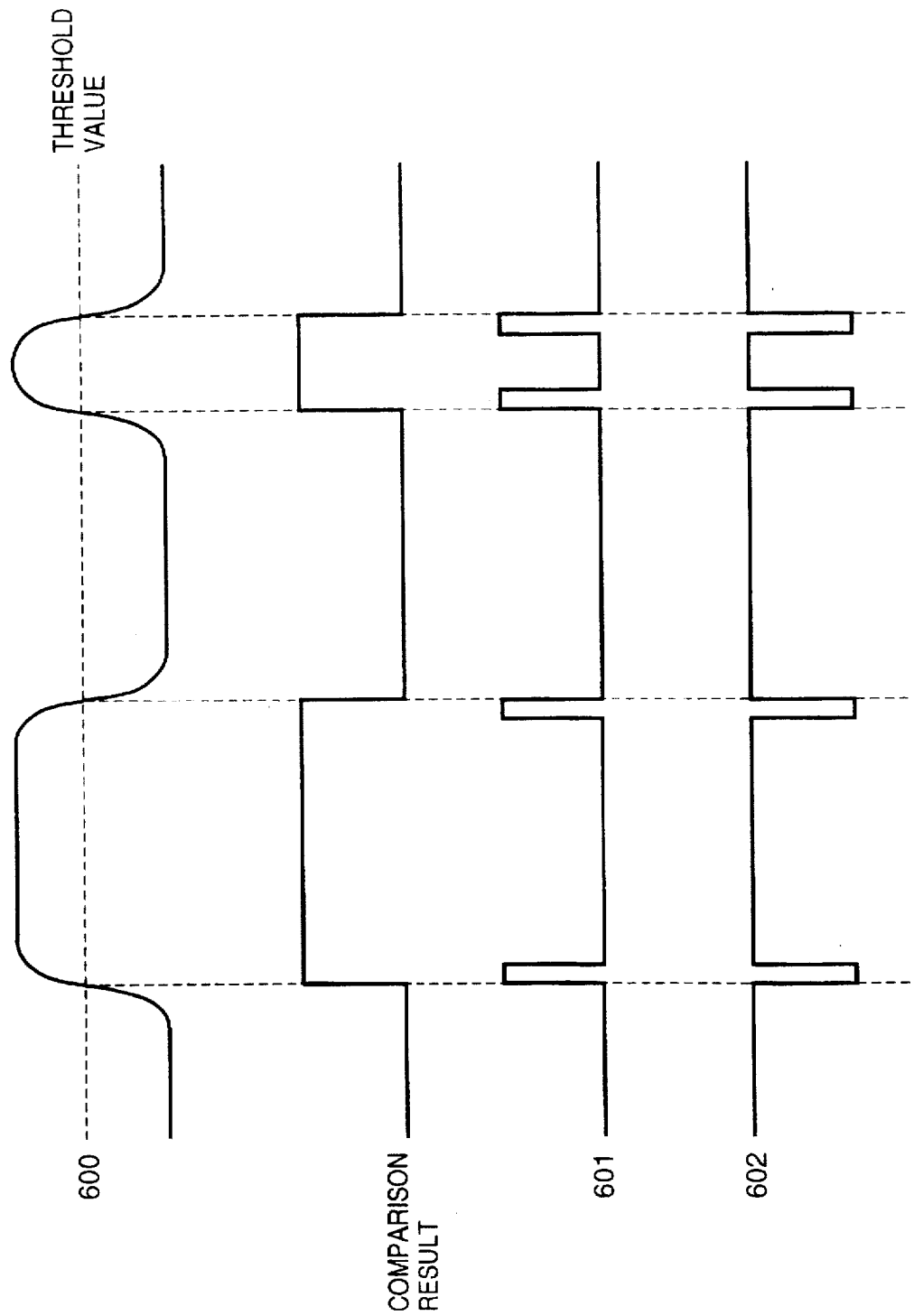
FIG. 24 is a timing chart showing the relationship between the image information and the control signal in a recording control unit of the 11th embodiment.

FIG. 24 shows the relationship between input image information 600 (gray density signal) and control signals 601 and 602 generated on the basis of a predetermined threshold value in the recording control unit 255 of the 11th embodiment. The control signal 601 is input to the PWM unit 253 shown in FIG. 15, and serves as a permission signal for image formation by the electrophotography method. On the other hand, the control signal 602 is input to the pseudo halftone processing unit 250, and serves as a permission signal for image formation by the ink-jet method. Note that these control signals permit image formation when they are at H level, and inhibit image formation when they are at L level.

In the 11th embodiment, as can be seen from FIG. 24, the control signal 601 changes to H level at only the edge portions of a portion where the comparison result between the image information 600 and the predetermined threshold value changes to H level. On the other hand, the control signal 602 has a phase opposite to that of the control signal 601. Therefore, in the 11th embodiment, input image information is basically reproduced by the ink-jet method, and the boundary region (edge portion) of a region having a predetermined level in the image is subjected to image formation by the electrophotography method in place of the ink-jet method.

Figure 25:
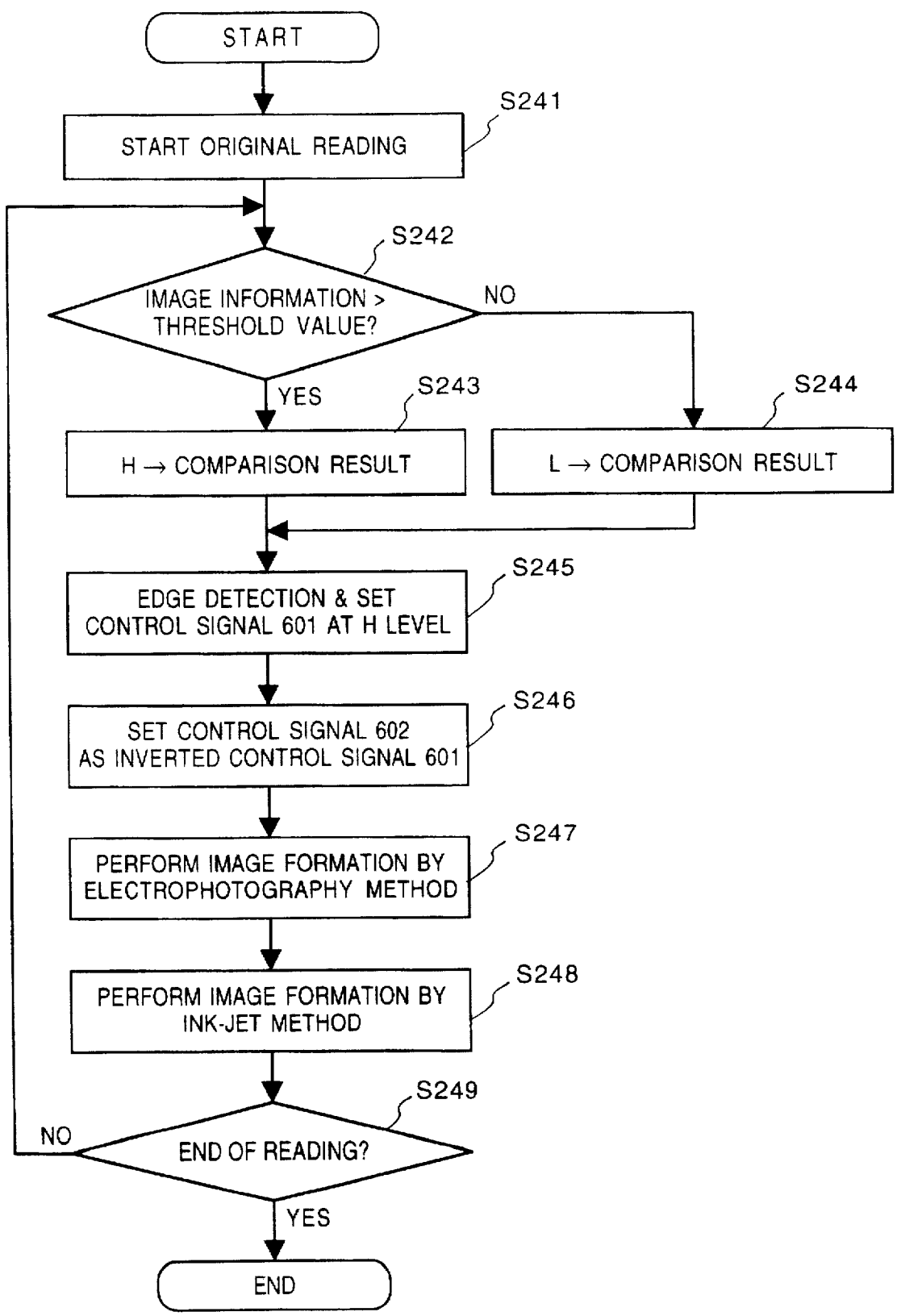
FIG. 25 is a flow chart showing the image formation control sequence of the 11th embodiment.

FIG. 25 is a flow chart showing the recording control in the recording control unit 255 of the 11th embodiment. Note that the processing shown in the flow chart of FIG. 25 is stored in, e.g., a ROM (not shown) as a processing program, and the processing program is read out and executed by a CPU (not shown).

When an original reading operation is started in step S241, the recording control unit 255 compares image information supplied from the image reading unit 100 with a predetermined threshold value, which is set in advance (step S242). As a result of comparison in step S242, if the image signal is larger than the threshold value, a 1-bit signal representing the comparison result is set at H level in step S243; otherwise, a 1-bit signal representing the comparison result is set at L level in step S244.

The flow then advances to step S245, a signal representing an edge portion (corresponding to a width of one to three pixels) is extracted from a period where the signals representing the comparison results are set at H level, and the control signal 601 is set at H level in correspondence with the extracted signal. More specifically, as for signals other than the signal of the edge portion, the control signal 601 is set at L level irrespective of the levels of the signals representing the comparison result. In step S246, the control signal 602 is generated as the control signal 601 is inverted. In step S247, the control signal 601 is supplied to the PWM unit 253 to control image formation by the electrophotography method. In step S248, the control signal 602 is supplied to the pseudo halftone processing unit 250 to control image formation by the ink-jet method.

Thereafter, an image is sequentially formed in accordance with the above-mentioned procedure in steps S242 to S248 until the original reading operation is completed in step S249.

As described above, according to the 11th embodiment, input image information is basically reproduced by the ink-jet method, and the boundary region (edge portion) of a region having a predetermined level in the image is subjected to image formation by the electrophotography method. More specifically, the edge portion of a solid black portion is recorded by only toner. Therefore, an image blur of an edge portion caused by ink smearing inherent to the ink-jet method can be prevented, and high-contrast, high-quality image formation can be realized.

In the 11th embodiment as well, other arrangements of the image formation control unit 210 can be adopted as in the ninth and 10th embodiments described above.

As described above, according to the embodiments of the present invention, in the hybrid copying machine, an image formed by the electrophotography method and an image formed by the ink-jet method are controlled not to overlap each other, thus realizing an image forming method and apparatus with good character/thin line reproducibility.

When only an edge portion is formed by the electrophotography method to be superposed on an image formed by the ink-jet method, an image forming method and apparatus, which can realize high-quality image formation that can eliminate an image blur of an edge portion caused by ink smearing inherent to the ink-jet method, can be realized.

When image formation is basically performed by the ink-jet method, and an edge portion is formed by the electrophotography method in place of the ink-jet method, an image forming method and apparatus, which can realize high-contrast, high-quality image formation free from an image blur of an edge portion caused by ink smearing inherent to the ink-jet method, can be realized.

In the 10th and 11th embodiments described above, an edge portion in a region where the color density signal is equal to or higher than a predetermined level is detected. Alternatively, similar processing may be performed by detecting an achromatic edge portion.

Image region discrimination may be performed by other methods.

(Modifications)

Modifications of the above-mentioned embodiments will be described below.

In each of the above embodiments, the electrophotography method is exemplified as the first recording method and the ink-jet method is exemplified as the second recording method in the hybrid copying machine. However, the present invention is not limited to such an example. The first recording method may be other methods as long as an image can be satisfactorily formed with a high resolution. On the other hand, the second recording method may also be other methods such as a thermal transfer method for recording a full-color image by melting or sublimating inks and transferring the inks onto a recording medium as long as a color image can be reproduced.

The ink-jet recording unit described in each of the above embodiments can adopt a so-called bubble-jet method which uses a head of a type which ejects ink droplets by utilizing film boiling by heat energy.

In each of the first to eighth embodiments described above, the color separation unit 5 determines the most frequently used color in an original image as the original color. For example, the undercolor may be discriminated by color-separating an original image, and the original color may be determined from colors excluding the undercolor.

Note that the present invention may be applied to either a system constituted by a plurality of apparatuses such as a host computer, an interface, a printer, and the like, or an apparatus consisting of a single device such as a copying machine.

The present invention may also be applied to a case wherein the invention is attained by supplying a program stored in a storage medium to the system or apparatus.

The edge portion detecting method may be other methods as long as they detect attributes of edge information for each of pixel by utilizing a digital filter for detecting edge portions.

The electropotography method may be applied to form the image consisting of pixels which belong to edge portions and have a high achromatic degree as black characters.

In contrast, the ink-jet method may be applied to form a portion of a dot image or a halftone image detected from an original image.

And attributes of the original image are not only color/monochrome, edge/non-edge, and achromatic/chromatic but also glossiness and so on.

As described above, according to the present invention, an image forming method and apparatus which combine a plurality of different methods, and can satisfactorily selectively use the plurality of methods in correspondence with the toner color of a toner cartridge and the original color can be provided.

Also, an image processing method and apparatus, which can detect the color of a toner cartridge set in the apparatus without observing an actually recorded output, and can prevent an image recorded in an undesired color from being output, can be provided.

Furthermore, an image processing method and apparatus, which can satisfactorily selectively use the plurality of methods in correspondence with the feature of an image, can be provided.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus comprising:

input means for inputting an original image;

determination means for determining a color or colors of the original image;

first image forming means for forming a monochrome image on the basis of the original image by using a single recording agent;

second image forming means for forming a color image on the basis of the original image by using a plurality of color recording agents;

detection means for detecting a color of the single recording agent of said first image forming means; and control means for controlling image forming operations of both said first and second image forming means in accordance with a combination of a determination result of said determination mean s and a detection result of said detection means.

2. The apparatus according to claim 1, further comprising display means for displaying a control state of said control means.

3. The apparatus according to claim 2, further comprising instruction means for inputting an operation instruction, and wherein said control means controls the image forming operations of said first and second image forming means in response to the operation instruction input from said instruction means in accordance with the control state displayed on said display means.

4. The apparatus according to claim 1, wherein said first image forming means performs the image forming operation by an electrophotography method, and said second image forming means performs the image forming operation by a non-electrophotography method.

5. The apparatus according to claim 4, wherein said first image forming means forms a monochrome image by the electrophotography method, and said second image forming means forms a full-color image by an ink-jet method.

6. The apparatus according to claim 5, wherein said second image forming means comprises a recording head for ejecting ink by utilizing heat energy.

7. The apparatus according to claim 1, wherein said control means forms the original image on a recording medium using said first image forming means when the color of the original image determined by said determination means coincides with the color of the recording agent detected by said detection means.

8. The apparatus according to claim 7, wherein said control means stops image formation when the color of the original image determined by said determination means does not coincide with the color of the recording agent detected by said detection means.

9. The apparatus according to claim 7, wherein said control means forms the original image on the recording medium using said second image forming means when the color of the original image determined by said determination means does not coincide with the color of the recording agent detected by said detection means.

10. The apparatus according to claim 7, wherein said control means stops image formation or forms the original image on the recording medium using said first image forming means, in accordance with the operation instruction input from said instruction means, when the color of the original image determined by said determination means does not coincide with the color of the recording agent detected by said detection means.

11. The apparatus according to claim 7, wherein said control means stops image formation or forms the original image on the recording medium using said second image forming means, in accordance with the operation instruction input from said instruction means, when the color of the original image determined by said determination means does not coincide with the color of the recording agent detected by said detection means.

12. An image forming apparatus comprising:
input means for inputting an original image;
color separation means for separating the original image into color component images;
first image forming means for forming a monochrome image by using a single recording agent;

second image forming means for forming a color image by using a plurality of color recording agents;
detection means for detecting a color of the single recording agent of said first image forming means; and
control means for controlling image forming operations of both said first and second image forming means in accordance with a combination of the color component images separated by said color separation means and a detection result of said detection means.

13. The apparatus according to claim 12, further comprising display means for displaying a control state of said control means.

14. The apparatus according to claim 13, further comprising instruction means for inputting an operation instruction, and wherein said control means controls the image forming operations of said first and second image forming means in response to the operation instruction input from said instruction means in accordance with the control state displayed on said display means.

15. The apparatus according to claim 12, wherein said first image forming means performs the image forming operation by an electrophotography method, and said second image forming means performs the image forming operation by a non-electrophotography method.

16. The apparatus according to claim 15, wherein said first image forming means forms a monochrome image by the electrophotography method, and said second image forming means forms a full-color image by an ink-jet method.

17. The apparatus according to claim 16, wherein said second image forming means comprises a recording head for ejecting ink by utilizing heat energy.

18. The apparatus according to claim 12, wherein when the number of color component images separated by said color separation means is one, and the color component coincides with the color of the recording agent detected by said detection means, said control means forms the color component image on a recording medium using said first image forming means.

19. The apparatus according to claim 18, wherein when the number of color component images separated by said color separation means is not less than two, said control means forms all the color component images on the recording medium using said second image forming means.

20. The apparatus according to claim 18, wherein when the number of color component images separated by said color separation means is one, and the color component does not coincide with the color of the recording agent detected by said detection means, said control means forms all the color component images on the recording medium using said second image forming means.

21. The apparatus according to claim 18, wherein when the number of color component images separated by said color separation means is not less than two and one of the color components coincides with the color of the single recording agent detected by said detection means, said control means forms the color component image coinciding with the color of the single recording agent detected by said detection means on the recording medium using said first image forming means, and thereafter, forms the other color component image on the recording medium using said second image forming means.

22. The apparatus according to claim 18, wherein when the number of color component images separated by said color separation means is one and the color component does not coincide with the color of the recording agent detected by said detection means, said control means forms the original image on the recording medium using said second image forming means.

23. The apparatus according to claim 18, wherein when the number of color component images separated by said color separation means is not less than two and one of the color components coincides with the color of the single recording agent detected by said detection means, said control means stops image formation, or forms the color component image coinciding with the color of the single recording agent detected by said detection means on the recording medium using said first image forming means, and thereafter, forms the other color component image on the recording medium using said second image forming means in accordance with the operation instruction input by said instruction means.

24. The apparatus according to claim 18, wherein when the number of color component images separated by said color separation means is one and the color component does not coincide with the color of the recording agent detected by said detection means, said control means stops image formation, or forms the original image on the recording medium using said second image forming means, in accordance with the operation instruction input from said instruction means.

25. The apparatus according to claim 18, wherein when the number of color component images separated by said color separation means is not less than two and one of the color components coincides with the color of the single recording agent detected by said detection means, said control means forms all the color component images on the recording medium using said second image forming means, or forms the color component image coinciding with the color of the single recording agent detected by said detection means on the recording medium using said first image forming means, and thereafter, forms the other color component image on the recording medium using said second image forming means, in accordance with the operation instruction input by said instruction means.

26. An image forming method for an image forming apparatus, which comprises first and second image forming means for recording an input original image on a recording medium, the first image forming means forms a monochrome image by using a single recording agent, and the second image forming means forms a color image by using a plurality of color recording agents, said method comprising:

a determination step of determining a color or colors of the original image;

a detection step of detecting a color of the single recording agent of said first image forming means; and a control step of controlling image forming operations of both said first and second image forming means in accordance with a combination of a determination result in the determination step and a detection result in the detection step.

27. The method according to claim 26, further comprising a display step of displaying a control state in the control step.

28. The method according to claim 26, wherein the control step includes the step of controlling to form the original image on the recording medium when the color of the original image determined in the determination step coincides with the color of the recording agent detected in the detection step, and to form the original image on the recording medium using said second image forming means when the color of the original image does not coincide with the color of the recording agent.

29. An image forming method for an image forming apparatus which comprises first and second image forming means for forming color component images on a recording medium, the first image forming means forms a monochrome image by using a single recording agent, and the second image forming means forms a color image by using a plurality of color recording agents, said method comprising:

a separation step of separating an input original image into color component images;

a detection step of detecting a color of the single recording agent of said first image forming means; and a control step of controlling image forming operations of both said first and second image forming means in accordance with a combination of the color component images separated in the separation step and a detection result in the detection step.

30. The method according to claim 29, further comprising a display step of displaying a control state in the control step.

31. The method according to claim 29, wherein the control step includes the steps of:

controlling, when the number of color component images separated in the separation step is one and the color component coincides with the color of the recording agent detected in the detection step, to form the color component image on the recording medium using said first image forming means;

controlling, when the number of color component images separated in the separation step is not less than two and one of the color components coincides with the color of the recording agent detected in the detection step, to form the color component image coinciding with the color of the recording agent detected in the detection step on the recording medium using said first image forming means and to form other color component images on the recording medium using said second image forming means; and controlling, when neither of the conditions are satisfied, to stop image formation or to form all color component images on the recording medium using said second image forming means.

32. An image processing apparatus comprising:

discriminating means for discriminating an attribute of an original image;

first image forming means for forming a monochrome image by using a single recording agent;

second image forming means for forming a color image by using a plurality of color recording agents;

detecting means for detecting a condition of said first image forming means; and control means for controlling image forming operations of both said first and second image forming means in accordance with a combination of a discrimination result of said discriminating means and a detection result of said detecting means.

33. The apparatus according to claim 32, wherein said attribute is a color attribute.

34. The apparatus according to claim 33, wherein said color attribute indicates the original image is monochrome or full-color.

35. The apparatus according to claim 33, wherein said color attribute indicates grayness information of pixels constructing the original image.

36. The apparatus according to claim 32, wherein said color attribute indicates a edge information of pixels constructing the original image.

37. An image processing method comprising:

a discriminating step of discriminating an attribute of an original image;

a first image forming step of forming a monochrome image by using a single recording agent;

a second image forming step of forming a color image by using a plurality of color recording agents;

a detecting step of detecting a condition of said first image forming step; and a control step of controlling image forming operations of both said first and second image forming steps in accordance with a combination of a discrimination result of said discriminating step and a detection result of said detecting step.

* * * * *

UNITED STATES PATENT AND TRADEMARK OFFICE
CERTIFICATE OF CORRECTION

PATENT NO. : 5,760,928
DATED : June 2, 1998
INVENTOR(S) : MOTOYAMA ET AL.

It is certified that error appears in the above-identified patent and that said Letters Patent is hereby corrected as shown below:

COLUMN 23:
    Line 6, "mean s" should read --means--.

COLUMN 26:
    Line 63, "a" should be deleted.

Signed and Sealed this

Twenty-ninth Day of December, 1998

Attest:

BRUCE LEHMAN

Attesting Officer      Commissioner of Patents and Trademarks